US012743978B2

(12) United States Patent
Kim et al.

(10) Patent No.: US 12,743,978 B2
(45) Date of Patent: Sep. 22, 2026

(54) ELECTRONIC DEVICE COMPRISING MULTIPLE DISPLAYS AND METHOD FOR REDUCING DEVIATION IN SCREEN QUALITY OF MULTIPLE DISPLAYS

(71) Applicant: Samsung Electronics Co., Ltd., Suwon-si (KR)

(72) Inventors: Hanyuool Kim, Suwon-si (KR); Taehyeong Kim, Suwon-si (KR); Kyoungmin Park, Suwon-si (KR); Eunjin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/034,284

(22) Filed: Jan. 22, 2025

(65) Prior Publication Data

US 2025/0166540 A1 May 22, 2025

Related U.S. Application Data

(63) Continuation of application No. PCT/KR2023/005227, filed on Apr. 18, 2023.

(30) Foreign Application Priority Data

Aug. 9, 2022 (KR) ........................ 10-2022-0099499
Oct. 26, 2022 (KR) ........................ 10-2022-0139237

(51) Int. Cl.
*G09G 3/00* (2006.01)
*G06F 1/16* (2006.01)
*G09G 3/3208* (2016.01)

(52) U.S. Cl.
CPC ........... *G09G 3/035* (2020.08); *G06F 1/1641* (2013.01); *G09G 3/3208* (2013.01); *G09G 2320/046* (2013.01); *G09G 2360/04* (2013.01)

(58) Field of Classification Search
None
See application file for complete search history.

(56) References Cited

U.S. PATENT DOCUMENTS 11,043,191 B1 6/2021 Kang et al.
11,106,240 B2 8/2021 Aurongzeb et al.
(Continued)

FOREIGN PATENT DOCUMENTS

EP 4318457 A1 2/2024
JP 2004117406 A 4/2004
(Continued)

OTHER PUBLICATIONS

International Search Report for PCT/KR2023/005227 mailed Jul. 27, 2023, 4 pages with English translation.
(Continued)

*Primary Examiner* — Ifedayo B Iluyomade
(74) *Attorney, Agent, or Firm* — Nixon & Vanderhye P.C.

(57) ABSTRACT

The electronic device may comprise: a first display, at least one second display, and at least one processor, comprising processing circuitry. At least one processor, individually and/or collectively, may be configured to: generate a first image to be displayed through the first display and a second image to be displayed through the at least one second display; generate a first prediction map by accumulating the first image; generate a second prediction map by accumulating the second image; generate a first compensation map for compensating for burn-in of the first display based on the first prediction map; generate a second compensation map for compensating for burn-in of the at least one second display based on the second prediction map; control a first DDI such that the first display displays a first compensation image; control the second DDI such that the at least one second display displays a second compensation image.

15 Claims, 18 Drawing Sheets

(56) References Cited

U.S. PATENT DOCUMENTS

| | | | | |
|---|---|---|---|---|
| 11,170,713 | B2 | 11/2021 | Jeon et al. | |
| 11,302,227 | B2 | 4/2022 | Kim et al. | |
| 11,423,860 | B2 | 8/2022 | Iyer et al. | |
| 11,430,370 | B2 | 8/2022 | Hong et al. | |
| 11,574,570 | B2 | 2/2023 | Kang et al. | |
| 12,012,658 | B2 | 6/2024 | Mizutani et al. | |
| 2020/0379510 | A1* | 12/2020 | Aurongzeb | G06F 1/1618 |
| 2021/0264870 | A1 | 8/2021 | Iyer et al. | |
| 2022/0044607 | A1 | 2/2022 | Kim et al. | |
| 2023/0306884 | A1* | 9/2023 | Choi | G06F 1/1626 |
| 2024/0112627 | A1 | 4/2024 | Kim et al. | |

FOREIGN PATENT DOCUMENTS

| | | | |
|---|---|---|---|
| KR | 20170109135 | A | 9/2017 |
| KR | 20190102443 | A | 9/2019 |
| KR | 20200063506 | A | 6/2020 |
| KR | 20200094862 | A | 8/2020 |
| KR | 20210101089 | A | 8/2021 |
| KR | 20220016011 | A | 2/2022 |
| KR | 20220016516 | A | 2/2022 |
| KR | 102417424 | B1 | 7/2022 |
| KR | 102621010 | B1 | 1/2024 |
| KR | 102665990 | B1 | 5/2024 |
| WO | 2022225247 | A1 | 10/2022 |
| WO | 2022265269 | A1 | 12/2022 |

OTHER PUBLICATIONS

Written Opinion of the ISA for PCT/KR2023/005227 mailed Jul. 27, 2023, 4 pages.

* cited by examiner

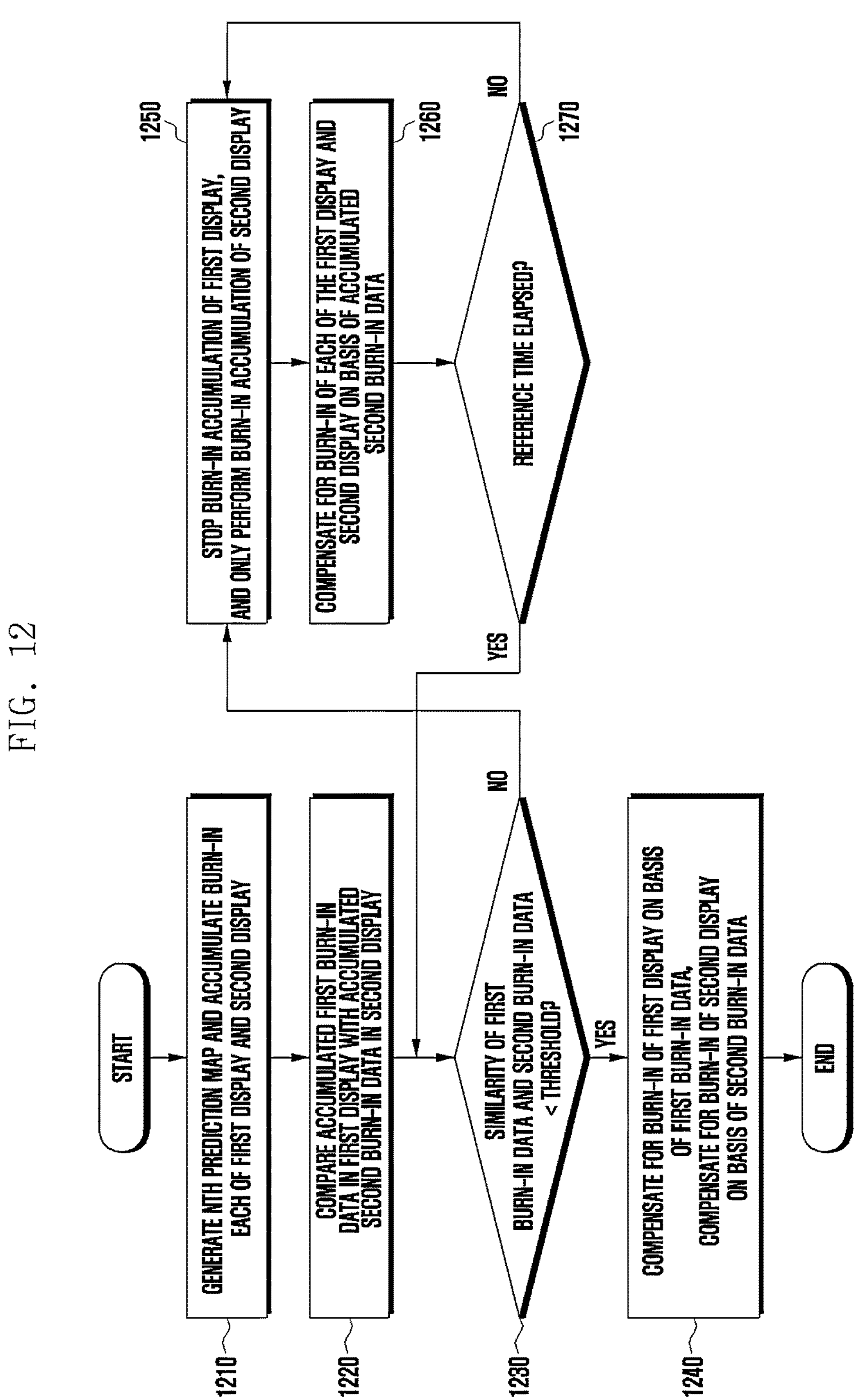
FIG. 12
START
GENERATE NTH PREDICTION MAP AND ACCUMULATE BURN-IN EACH OF FIRST DISPLAY AND SECOND DISPLAY
1210
COMPARE ACCUMULATED FIRST BURN-IN DATA IN FIRST DISPLAY WITH ACCUMULATED SECOND BURN-IN DATA IN SECOND DISPLAY
1220
SIMILARITY OF FIRST BURN-IN DATA AND SECOND BURN-IN DATA < THRESHOLD?
1230
YES
NO
COMPENSATE FOR BURN-IN OF FIRST DISPLAY ON BASIS OF FIRST BURN-IN DATA, COMPENSATE FOR BURN-IN OF SECOND DISPLAY ON BASIS OF SECOND BURN-IN DATA
1240
END
STOP BURN-IN ACCUMULATION OF FIRST DISPLAY, AND ONLY PERFORM BURN-IN ACCUMULATION OF SECOND DISPLAY
1250
COMPENSATE FOR BURN-IN OF EACH OF THE FIRST DISPLAY AND SECOND DISPLAY ON BASIS OF ACCUMULATED SECOND BURN-IN DATA
1260
REFERENCE TIME ELAPSED?
1270
NO
YES

ELECTRONIC DEVICE COMPRISING MULTIPLE DISPLAYS AND METHOD FOR REDUCING DEVIATION IN SCREEN QUALITY OF MULTIPLE DISPLAYS

CROSS-REFERENCE TO RELATED APPLICATIONS

This application is a continuation of International Application No. PCT/KR2023/005227 designating the United States, filed on Apr. 18, 2023, in the Korean Intellectual Property Receiving Office and claiming priority to Korean Patent Application Nos. 10-2022-0099499, filed on Aug. 9, 2022, and 10-2022-0139237, filed on Oct. 26, 2022, in the Korean Intellectual Property Office, the disclosures of each of which are incorporated by reference herein in their entireties.

BACKGROUND

Field

The disclosure relates to an electronic device including multiple displays and a method of reducing deviation in screen quality of the multiple displays.

Description of Related Art

Electronic devices are evolving from a uniform rectangular shape to a variety of shapes. For example, there is active research and development on electronic devices with flexible displays.

Electronic devices are being researched and developed to have a form factor in which a display may be folded, bent, rolled, or unfolded with the application of a flexible display.

The information described above may be provided as the related art to aid in understanding of the present disclosure. No assertion or determination is made with respect to the applicability of any of the above-mentioned as the prior art related to the present disclosure.

A flexible display may be applied with an organic light-emitting diode (OLED). For example, a display panel of the flexible display has flexible characteristics, and the pixels of the display panel may include OLEDs.

The display panel, including OLED, may experience a phenomenon known as burn-in, in which residual images or smudges remain on the screen. The burn-in of the display panel may occur due to deviations in the driving time of OLEDs for multiple pixels (e.g., accumulated emission time).

An electronic device may be designed with a form factor allowing the flexible display to be folded, bent, rolled, or unfolded, and may include multiple displays. For example, the electronic device may be a foldable electronic device with a display that can be folded, where the foldable electronic device may include a main display that folds in an in-folding manner and a sub-display disposed separately from the main display. For example, the electronic device may include a first housing and a second housing configured to be folded from one end of the first housing. The main display may be disposed on a first surface of the first housing and a third surface of the second housing, such that they face each other when the electronic device is in a folded state. The sub-display may be disposed on a second surface of the first housing, opposite to the first surface of the first housing. As described above, the electronic device including multiple displays may experience deviation in screen quality between the multiple displays due to differences in usage time and deviations in the characteristics of the screens displayed by each of the multiple displays.

SUMMARY

Embodiments of the disclosure may provide an electronic device including multiple displays and a method of reducing deviation in screen quality of the multiple displays.

An electronic device, according to an example embodiment is provided, the electronic device including: a first display; at least one second display different from the first display; a first display driver integrated circuit (DDI) configured to drive the first display; at least one second DDI configured to drive the at least one second display; and at least one processor, comprising processing circuitry, wherein at least one processor may include: an image generating module comprising circuitry configured to generate a first image to be displayed through the first display and a second image to be displayed through the at least one second display; a first prediction module comprising circuitry configured to accumulate the first image to generate a first prediction map indicative of a degree of burn-in of the first display; a second prediction module comprising circuitry configured to accumulate the second image to generate a second prediction map indicative of a degree of burn-in of the at least one second display; a first analysis module comprising circuitry configured to generate a first compensation map for compensating for burn-in of the first display based the first prediction map, and to store the generated first compensation map in a first memory; a second analysis module comprising circuitry configured to generate a second compensation map for compensating for burn-in of the at least one second display based on the second prediction map, and to store the generated second compensation map in a second memory; a first compensation module comprising circuitry configured to convert the first image into a first compensation image based the first compensation map, and to control the first DDI to allow the first display to display the first compensation image; and a second compensation module comprising circuitry configured to convert the second image into a second compensation image based on the second compensation map, and to control the second DDI to allow the at least one second display to display the second compensation image.

A method of operating an electronic device, according to an example embodiment is provided, the electronic device including: a first display; at least one second display different from the first display; a first display driver integrated circuit (DDI) configured to drive the first display; and at least one second DDI configured to drive the at least one second display. The method may include: generating, a first image to be displayed through the first display and a second image to be displayed through the at least one second display; accumulating the first image to generate a first prediction map indicative of a degree of burn-in of the first display; accumulating the second image to generate a second prediction map indicative of a degree of burn-in of the at least one second display; generating a first compensation map for compensating for burn-in of the first display based on the first prediction map, and storing the generated first compensation map in a first memory; generating a second compensation map for compensating for burn-in of the at least one second display based on the second prediction map, and storing the generated second compensation map in a second memory; converting the first image into a first compensation image based on the first compensation map, and controlling the first DDI to allow the first display to display the first compensation image; and converting the second image into a second compensation image based on the second compensation map, and controlling the second DDI to allow the at least one second display to display the second compensation image.

The electronic device and method according to various example embodiments of the present disclosure can reduce deviation in screen quality in an electronic device including multiple displays and multiple displays, enable efficient processor operation by reducing the computational load of operations aimed at reducing deviation in screen quality, and reduce power consumption.

BRIEF DESCRIPTION OF THE DRAWINGS

The above and other aspects, features, and advantages of certain embodiments of the present disclosure will be more apparent from the following detailed description, taken in conjunction with accompanying drawings, in which:

FIG. 12 is a flowchart illustrating an example method by which an electronic device compensates for burn-in based on a user pattern of using each of multiple displays, according to various embodiments;

DETAILED DESCRIPTION

Figure 1:
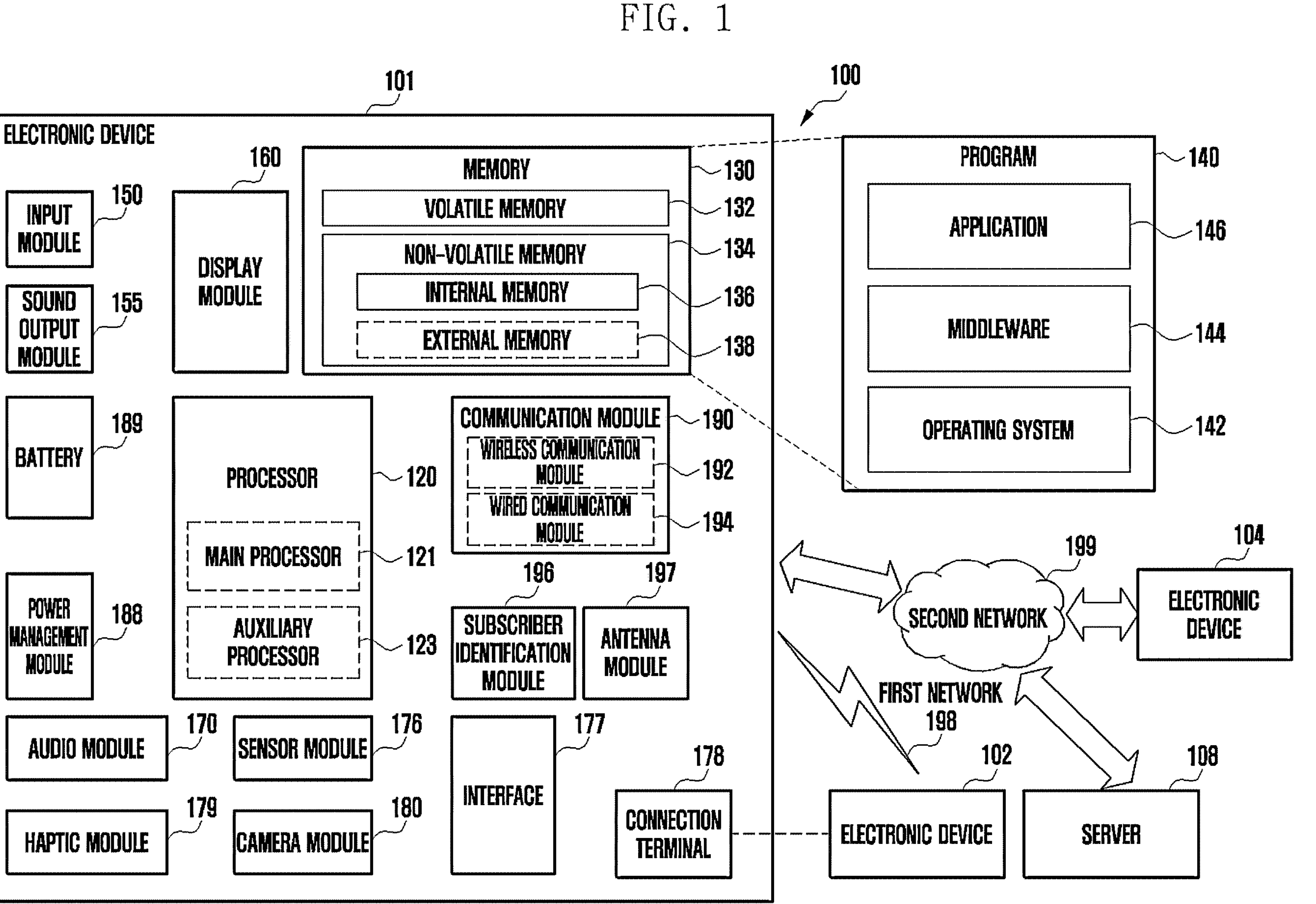
FIG. 1 is a block diagram illustrating an example electronic device in a network environment according to various embodiments.

FIG. 1 is a block diagram illustrating an example electronic device 101 in a network environment 100 according to various examples. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an example, the electronic device 101 may communicate with the electronic device 104 via the server 108. According to an example, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various examples, at least one of the components (e.g., the connection terminal 178) may be omitted from the electronic device 101, or one or more other components may be added in the electronic device 101. In various examples, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an example, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an example, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an example, the auxiliary processor 123 (e.g., an image signal processor or a communication processor) may be implemented as part of another component (e.g., the camera module 180 or the communication module 190) functionally related to the auxiliary processor 123. According to an example, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory may include at least one of an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an example, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an example, the display module 160 may include a touch sensor adapted to detect a touch, or a pressure sensor adapted to measure the intensity of force incurred by the touch.

The audio module 170 may convert a sound into an electrical signal and vice versa. According to an example, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an example, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an example, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an example, the haptic module 179 may include, for example, a motor, a piezoelectric element, or an electric stimulator.

The camera module 180 may capture a still image or moving images. According to an example, the camera module 180 may include one or more lenses, image sensors, image signal processors, or flashes.

The power management module 188 may manage power supplied to the electronic device 101. According to an example, the power management module 188 may be implemented as at least part of, for example, a power management integrated circuit (PMIC).

The battery 189 may supply power to at least one component of the electronic device 101. According to an example, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an example, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an example, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example, the antenna module 197 may include an antenna including a radiating element including a conductive material or a conductive pattern formed in or on a substrate (e.g., a printed circuit board (PCB)). According to an example, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an example, another component (e.g., a radio frequency integrated circuit (RFIC)) other than the radiating element may be additionally formed as part of the antenna module 197.

According to various examples, the antenna module 197 may form an mmWave antenna module. According to an example, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an example, all or some of operations to be executed at the electronic device 101 may be executed at one or more of the external electronic devices (e.g. electronic devices 102 and 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example, the external electronic device 104 may include an internet-of-things (IoT)

device. The server 108 may be an intelligent server using machine learning and/or a neural network. According to an example, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various examples may be one of various types of electronic devices. The electronic devices may include, for example, a portable communication device (e.g., a smartphone), a computer device, a portable multimedia device, a portable medical device, a camera, a wearable device, a home appliance, or the like. According to an example of the disclosure, the electronic devices are not limited to those described above.

It should be appreciated that various examples of the disclosure and the terms used therein are not intended to limit the technological features set forth herein to particular examples and include various changes, equivalents, or replacements for a corresponding example. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various examples of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example, the module may be implemented in a form of an application-specific integrated circuit (ASIC).

Various examples as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example, a method according to various examples of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various examples, each component (e.g., a module or a program) of the above-described components may include a single entity or multiple entities, and some of the multiple entities may be separately disposed in different components. According to various examples, one or more of the above-described components may be omitted, or one or more other components may be added. Alternatively or additionally, a plurality of components (e.g., modules or programs) may be integrated into a single component. In such a case, according to various examples, the integrated component may still perform one or more functions of each of the plurality of components in the same or similar manner as they are performed by a corresponding one of the plurality of components before the integration. According to various examples, operations performed by the module, the program, or another component may be carried out sequentially, in parallel, repeatedly, or heuristically, or one or more of the operations may be executed in a different order or omitted, or one or more other operations may be added.

Figure 2:
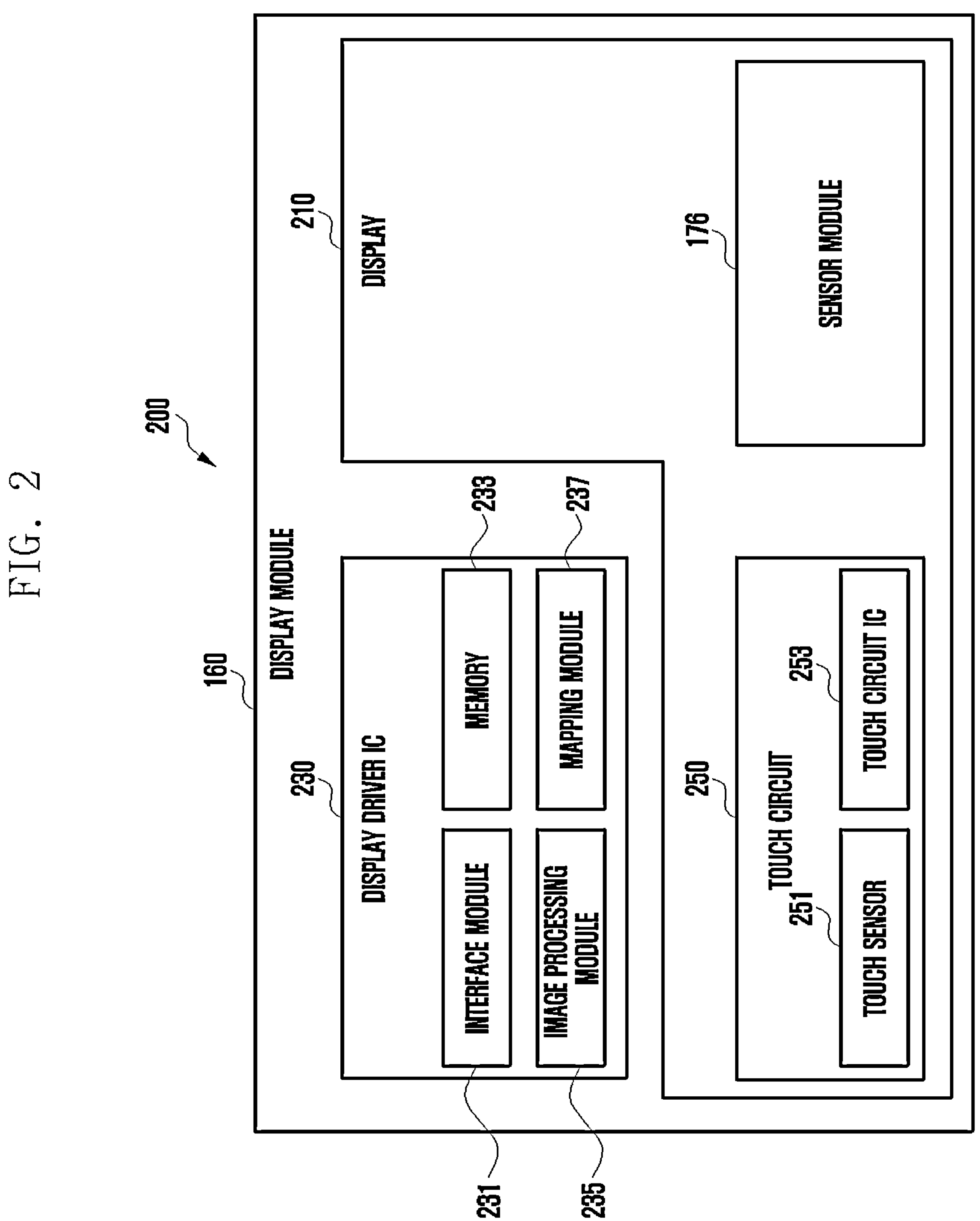
FIG. 2 is a block diagram illustrating an example configuration of a display module, according various embodiments.

FIG. 2 is a block diagram 200 illustrating an example configuration of the display module 160, according to various embodiments. With reference to FIG. 2, the display module 160 may include a display 210, and a display driver IC (DDI) 230 for controlling the display 210. The DDI 230 may include an interface module (e.g., including various circuitry and/or executable program instructions) 231, a memory 233 (e.g., buffer memory 350), an image processing module (e.g., including various circuitry and/or executable program instructions) 235, and/or a mapping module (e.g., including various circuitry and/or executable program instructions) 237. For example, the DDI 230 may receive image information, including image data, or an image control signal corresponding to a command to control the image data, from another element of the electronic device 101 through the interface module 231. For example, according to an embodiment, the image information may be received from the processor 120 (e.g., main processor 121 (e.g., application processor)) or auxiliary processor 123 (e.g., graphics processing unit) operated independently from the function of the main processor 121. The DDI 230 may communicate with a touch circuit 250, the sensor module 176, or the like through the interface module 231. In addition, the DDI 230 may store at least a portion of the received image information in the memory 233, for example, in units of frames. For example, the image processing module 235 may perform pre-processing or post-processing (e.g., resolution, brightness, or scaling) of at least a portion of the image data at least on the basis of characteristics of the image data or characteristics of the display

210. The mapping module 237 may generate a voltage value or a current value corresponding to the image data that has been pre-processed or post-processed through the image processing module 135. According to an embodiment, the generation of the voltage value or current value may be performed at least in part on the basis of attributes of the pixels of the display 210 (e.g., arrangement of the pixels (RGB stripe or pentile structure), or size of each sub-pixel). At least some pixels of the display 210 may be driven, for example, at least in part on the basis of the voltage value or current value such that visual information (e.g., text, images, or icons) corresponding to the image data may be displayed through the display 210.

According to an embodiment, the display module 160 may further include the touch circuit 250. The touch circuit 250 may include a touch sensor 251 and a touch sensor IC 253 for controlling the touch sensor 251. For example, the touch sensor IC 253 may control the touch sensor 251 to detect a touch input or hovering input to a specific position of the display 210. For example, the touch sensor IC 253 may detect a touch input or hovering input by measuring a change in a signal (e.g., voltage, light intensity, resistance, or quantity of charge) for a specific position of the display 210. The touch sensor IC 253 may provide information (e.g., position, area, pressure, or time) on the detected touch input or hovering input to the processor 120. According to an embodiment, at least a portion of the touch circuit 250 (e.g., touch sensor IC 253) may be included as part of the display driver IC 230, as part of the display 210, or as part of another element (e.g., auxiliary processor 123) disposed outside the display module 160.

According to an embodiment, the display module 160 may further include at least one sensor of the sensor module 176 (e.g., fingerprint sensor, iris sensor, pressure sensor, or illuminance sensor), or a control circuit for the sensor. In this case, the at least one sensor or control circuit therefor may be embedded in a portion of the display module 160 (e.g., display 210 or DDI 230) or a portion of the touch circuit 250. For example, in case that the sensor module 176 embedded in the display module 160 includes a biometric sensor (e.g., fingerprint sensor), the biometric sensor may obtain biometric information (e.g., fingerprint image) related to a touch input through some area of the display 210. For another example, in case that the sensor module 176 embedded in the display module 160 includes a pressure sensor, the pressure sensor may obtain pressure information related to a touch input through some or all areas of the display 210. According to an embodiment, the touch sensor 251 or the sensor module 176 may be disposed between pixels in a pixel layer of the display 210, or on or underneath the pixel layer.

Figure 3:
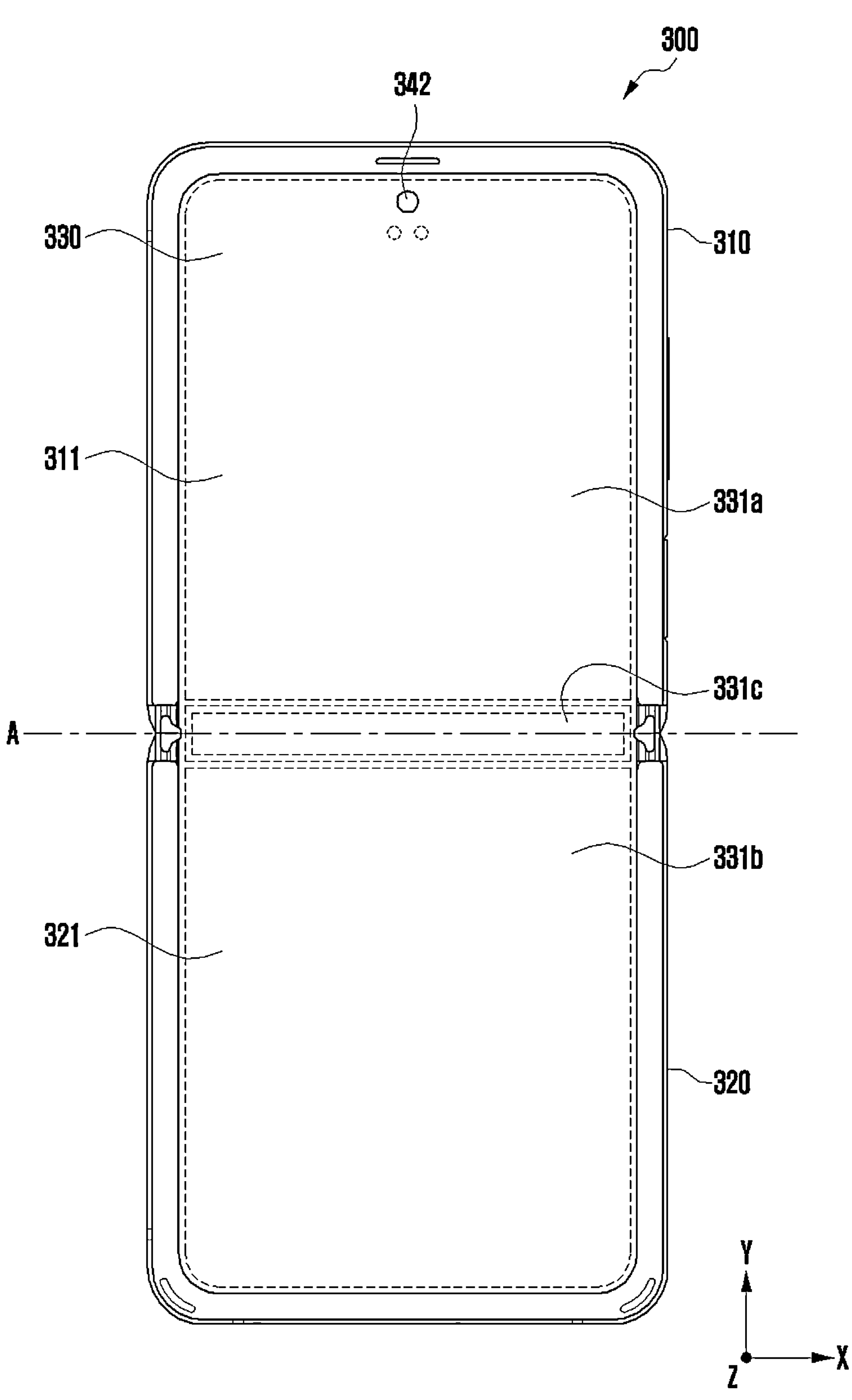
FIG. 3 is a diagram illustrating a top plan view of a front surface of an electronic device, in an unfolded state of the electronic device, according to various embodiments.

FIG. 3 is a diagram illustrating a top plan view of a front surface of an electronic device 300, in an unfolded state of the electronic device 300, according to various embodiments.

Figure 4:
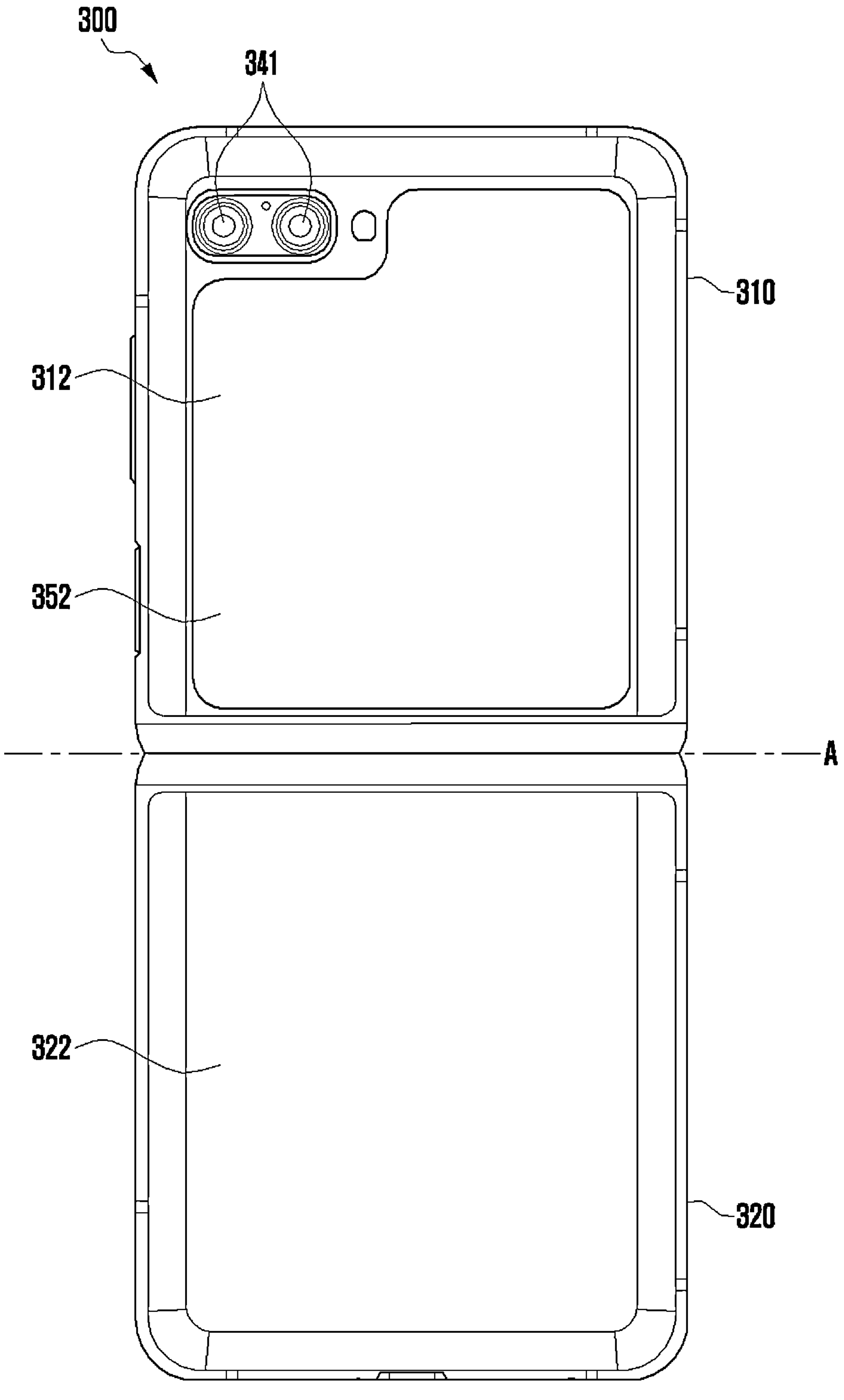
FIG. 4 is a diagram illustrating top plan view of a rear surface of an electronic device, in an unfolded state of the electronic device, according to various embodiments.

FIG. 4 is a diagram illustrating a top plan view of a rear surface of the electronic device 300, in an unfolded state of the electronic device 300, according to various embodiments.

Figure 5:
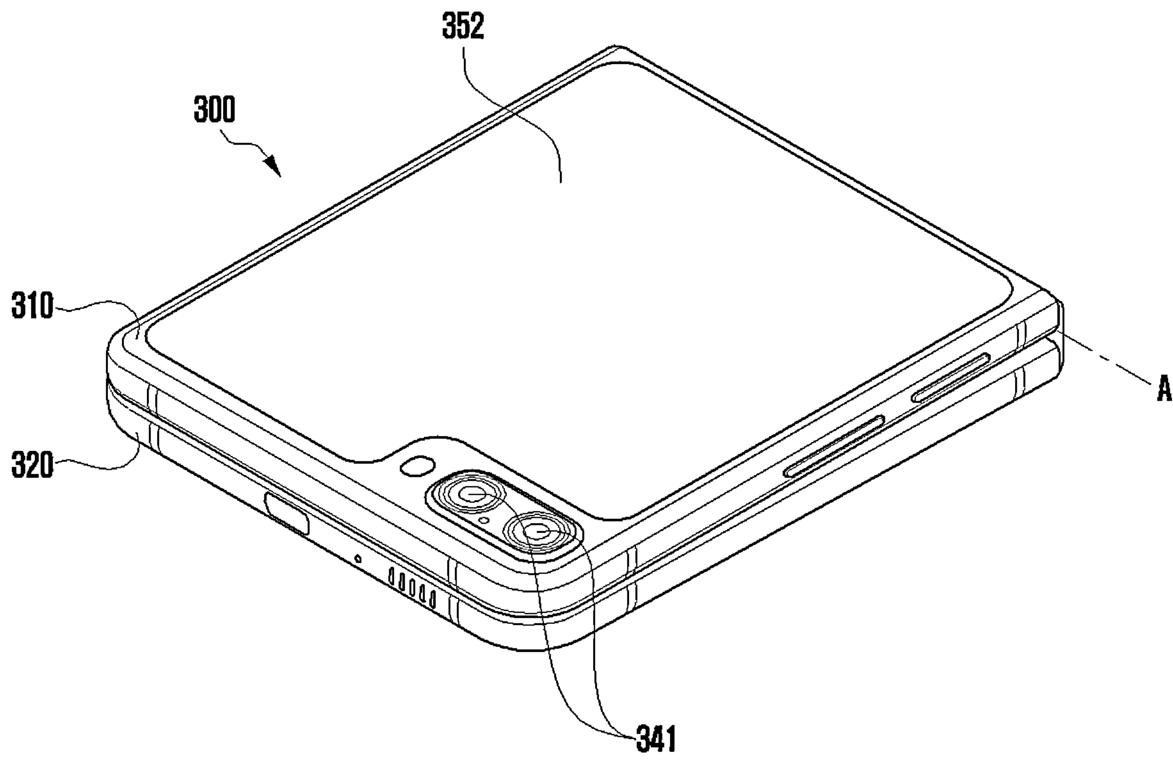
FIG. 5 is a perspective view illustrating a folded state of an electronic device, according to various embodiments.

FIG. 5 is a perspective view illustrating a folded state of the electronic device 300, according to various embodiments.

Figure 6:
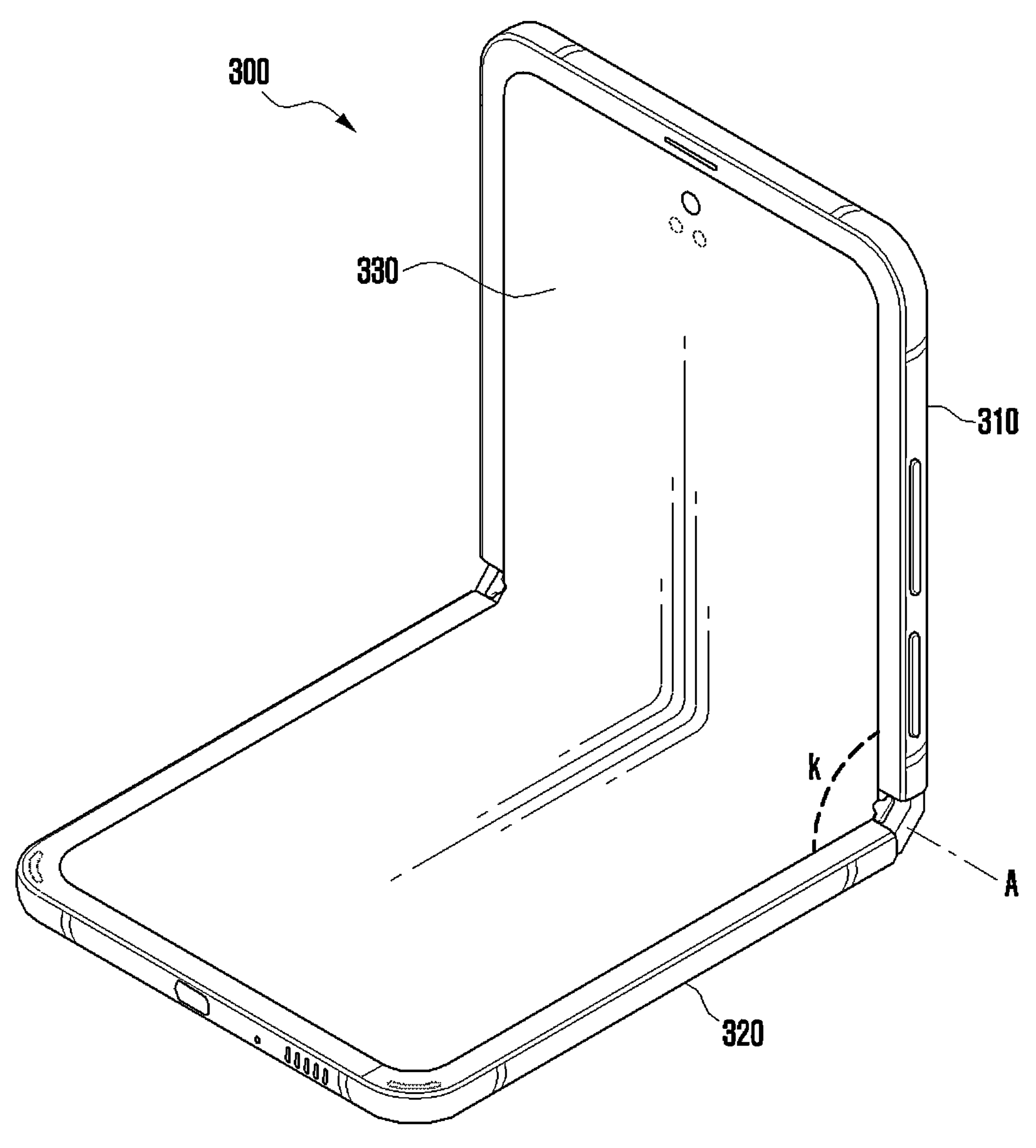
FIG. 6 is a perspective view illustrating an intermediate state of an electronic device, according to various embodiments.

FIG. 6 is a perspective view illustrating an intermediate state of the electronic device 300, according to various embodiment.

With reference to FIGS. 3, 4, 5 and 6 (which may be referred to as FIGS. 3 to 6), the electronic device 300 according to an embodiment (e.g., electronic device 101 in FIG. 1) may include a first housing 310 and a second housing 320, which are rotatably coupled to each other about a folding area. The electronic device 300 may include a first display 330 that is visible through a first surface 311 of the first housing 310 and a third surface 321 of the second housing 320, and/or a second display 352 (e.g., sub-display) that is visible through a second surface 312 of the first housing 310.

According to an embodiment, the first housing 310 may include the first surface 311, which faces a first direction in an unfolded state of the electronic device 300 and on which the first display 330 (e.g., main display) is disposed, and the second surface 312, which faces a second direction opposite the first direction.

According to an embodiment, the second housing 320 may include a third surface 321, on which the first display 330 is disposed and which is disposed parallel to the first surface 311 when the electronic device 300 is in an unfolded state, and a fourth surface 322 opposite the third surface 321. According to an embodiment, in an unfolded state of the electronic device 300, the third surface 321 may be disposed to face the first direction, and the fourth surface 322 may be disposed to face the second direction.

According to an embodiment, the electronic device 300 may be an in-folding type foldable electronic device or an out-folding type foldable electronic device. For example, when the electronic device 300 is an in-folding type foldable electronic device, in a folded state of the electronic device 300, the first surface 311 and the third surface 321 may be disposed to face each other, thereby allowing the first display 330 not to be visible from the outside. For example, when the electronic device 300 is an out-folding type foldable electronic device, in a folded state of the electronic device 300, the second surface 312 and the fourth surface 322 may be disposed to face each other, thereby allowing the first display 330 to be visible from the outside. In the following description, the electronic device 300 is illustratively described as an in-folding type foldable electronic device. However, an embodiment of the present disclosure may not be limited to the described example.

According to an embodiment, a hinge module (not illustrated) may be disposed in the folding area of the electronic device 300. According to an embodiment, the hinge module (not illustrated) may be disposed to couple one side surface of the first housing 310 with one side surface of the second housing 320, allowing the first housing 310 and the second housing 320 to rotate relative to each other. According to an embodiment, the hinge module (not illustrated) may form a folding axis (e.g., axis A) about which the electronic device 300 folds. For example, in a folded state of the electronic device 300, the first surface 311 of the first housing 310 and the third surface 321 of the second housing 320 may be disposed to face each other. In an unfolded state of the electronic device 300, the first surface 311 of the first housing 310 and the third surface 321 of the second housing 320 may be disposed parallel to each other with the folding axis (e.g., axis A) in between.

According to an embodiment, the first display 330 may be a flexible display. According to an embodiment, the first display 330 may be disposed on the first surface 311 of the first housing 310 and the third surface 321 of the second housing 320. For example, the first display 330 may be disposed to extend from the first surface 311 to the third surface 321, thereby substantially forming the first surface 311 and the third surface 321 of the electronic device 300. According to an embodiment, the first display 330 may include a first area 331a disposed on the first surface 311, a second area 331b disposed on the third surface 321, and a third area 331c disposed to correspond to the folding area. According to an embodiment, the third area 331c may be disposed between the first area 331a and the second area 331b.

According to an embodiment, the second display 352 may serve, for example, as a sub-display. According to an embodiment, the second display 352 may display a user interface or designated notification in place of the first display 330 when the first display 330 is in a folded state of not being visible in the folded state. According to an embodiment, the second display 352 may be disposed on the second surface 312 of the first housing 310. The second display 352 may be disposed to substantially form the second surface 312 of the electronic device 300. For example, on the second surface 312 of the electronic device 300, the second display 352 may be disposed in a remaining area, excluding a partial area where the camera module 341 is disposed. An embodiment of the present disclosure is not limited to the illustrated example regarding the area and size of area where the second display 352 is formed, and may be variously modified.

According to an embodiment, the electronic device 300 may include at least one camera module (e.g., including at least one camera) 341 (e.g., camera module 180 in FIG. 1). According to an embodiment, the camera module 341 may be disposed on the second surface 312 of the first housing 310. According to an embodiment, the electronic device 300 may further include a camera module (e.g., camera module 342 in FIG. 3) disposed on the first surface 311 on which the first display 330 is disposed or on the third surface 321. The camera module 342 disposed on the first surface 311 or the third surface 321 may be disposed in an under-display camera form to overlap at least a portion of the first display 330.

According to an embodiment, an intermediate state of the electronic device 300, as illustrated in FIG. 6, may represent a state between a folded state and an unfolded state. For example, the intermediate state may refer to a free-stop state in which the first housing 310 and the second housing 320 have a specific angle (e.g., angle k) between 0 degrees and approximately 180 degrees.

According to an embodiment, the folding axis (e.g., axis A) of the electronic device 300 may be disposed to traverse the first display 330 in a horizontal direction (e.g., x direction in FIG. 3) or disposed to traverse the first display 330 in a vertical direction (e.g., y direction in FIG. 3). For example, according to the illustrated example illustrated in FIGS. 3 to 6, the folding axis (e.g., axis A) of the electronic device 300 is disposed to traverse the first display 330 in a horizontal direction (e.g., x direction in FIG. 3), but an embodiment of the present disclosure is not limited to the illustrated example and the folding axis (e.g., axis A) of the electronic device 300 may be disposed to traverse the first display 330 in a vertical direction (e.g., y direction in FIG. 3).

Figure 7:
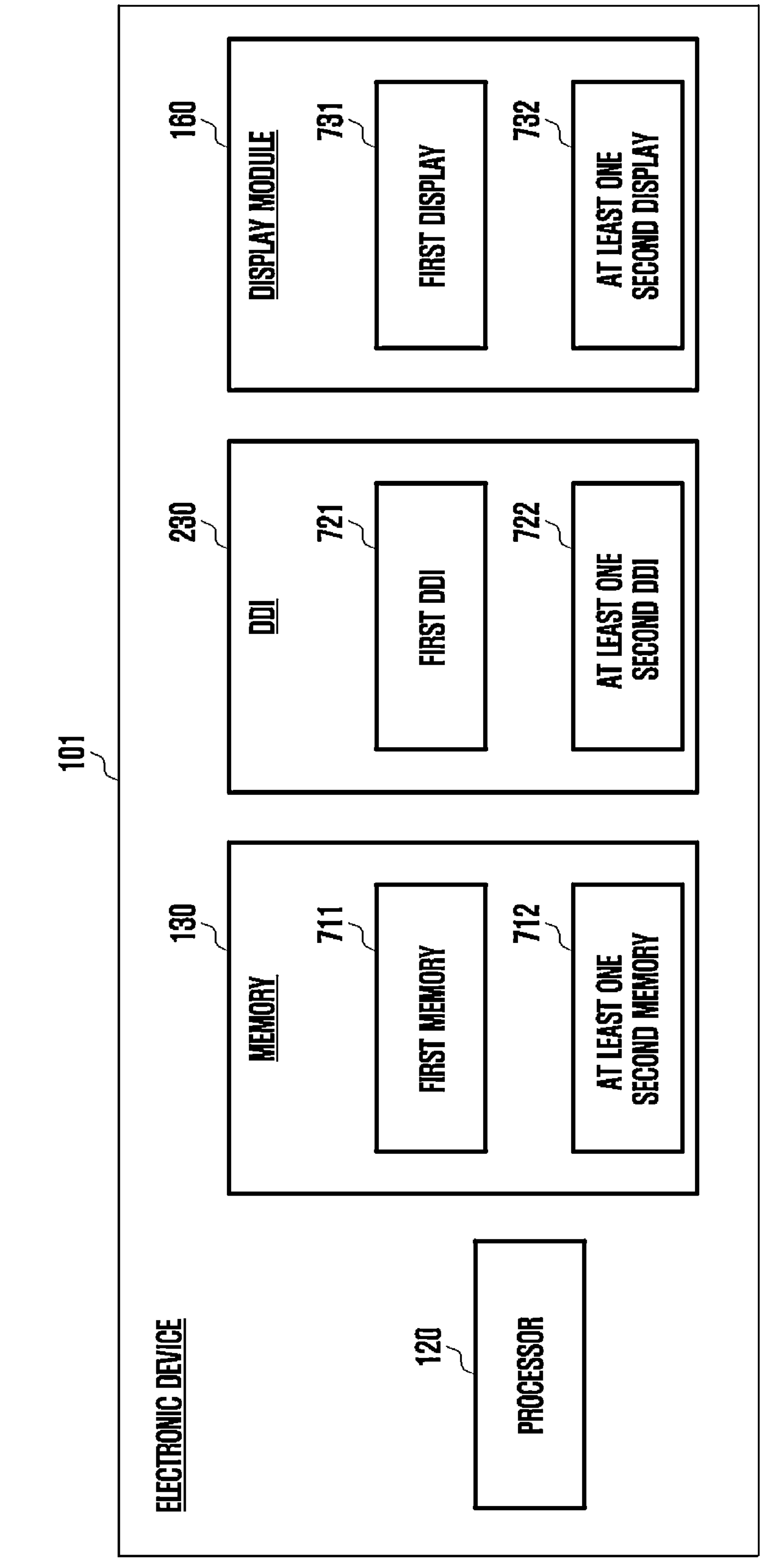
FIG. 7 is a block diagram illustrating an example configuration of an electronic device, according to various embodiments.

FIG. 7 is a block diagram illustrating an example configuration of the electronic device 101, according to various embodiments.

With reference to FIG. 7, the electronic device 101, according to an embodiment, may include the processor (e.g., including processing circuitry) 120, the memory 130, the DDI 230, and/or the display module (e.g., including a display) 160.

The processor 120 may include various processing circuitry and be configured to control an overall operation of the electronic device 101. For example, the operation of the electronic device 101 disclosed herein may be controlled by the processor 120.

When an application is executed, the processor 120 may render an image displayed through the display module 160 on the basis of the executed application. The processor 120 may accumulate the rendered image to predict burn-in of the display module 160 and generate a compensation map to compensate for the predicted burn-in. The processor 120 may control the DDI 230 to generate a compensation image on the basis of the compensation map.

According to an embodiment, the processor 120 may include a single processor 120. According to an embodiment, the processor 120 may include multiple processors 120. For example, the processor 120 may include a first processor (not illustrated) for controlling the first display 731, and/or at least one second processor (not illustrated) for controlling at least one second display 732. The electronic device 101 may include a plurality of processors (not illustrated), which may be configured to correspond one-to-one with each of the multiple displays 731 and 732. The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment, the processor 120 may perform a first process including generation of an image, burn-in prediction, and burn-in compensation operations related to the first display 731, and may perform at least one second process including generation of an image, burn-in prediction, and burn-in compensation operations related to at least one second display 732. The processor 120 may perform the first process related to the first display 731 and at least one second process related to at least one second display 732 independently of each other. For example, the processor 120 may process the first process and at least one second process in a parallel form. The first process and at least one second process, which are processed in parallel, may each be referred to as a first pipeline (e.g., first pipeline 1101 in FIG. 11) and at least one second pipeline (e.g., second pipeline 1102 in FIG. 11).

In the disclosure, when the electronic device 101 performs an operation according to the first pipeline 1101, it may refer, for example, to the processor 120 (e.g., first processor (not illustrated)) performing the first process including generation of an image, burn-in prediction, and burn-in compensation operations related to the first display 731. In the present disclosure, when the electronic device 101 performs an operation according to the second pipeline 1102, it may refer, for example, to the processor 120 (e.g., at least one second processor (not illustrated)) performing the second process including generation of an image, burn-in prediction, and burn-in compensation operations related to at least one second display 732.

In the disclosure, when the electronic device 101 activates the first pipeline 1101, it may refer, for example, to the processor 120 (e.g., first processor (not illustrated)) performing at least a portion of the image generation, burn-in prediction, and burn-in compensation operations related to the first display 731.

In the disclosure, when the electronic device 101 activates the second pipeline 1102, it may refer, for example, to the processor 120 (e.g., at least one second processor (not illustrated)) performing at least a portion of the image generation, burn-in prediction, and burn-in compensation operations related to the second display 732.

The memory 130 may store instructions that allow the electronic device 101 to perform the operations described in the present disclosure. For example, the memory 130 (e.g., memory 130 in FIG. 1) may store instructions that, when executed, allow the processor 120 to perform at least some of the operations described in the present disclosure. The memory 130 may store a plurality of applications.

According to an embodiment, the memory 130 may include a plurality of memories. The memory 130 may include a first memory 711 corresponding to the first display 731, and/or at least one second memory 712 corresponding to at least one second display 732. The electronic device 101 may include a plurality of memories 130, which may be configured to correspond one-to-one with each of the multiple displays 731 and 732. According to an embodiment, the first memory 711 and at least one second memory 712 may be merged into a single memory 130, rather than being separated from each other.

The display module 160 may include multiple displays 731 and 732. For example, the display module 160 may include a first display 731 and/or at least one second display 732. At least one second display 732 may be a display that is physically separate from the first display 731 and operates independently. For example, the processor 120 may independently control the first display 731 and at least one second display 732.

The DDI 230 may include a first DDI 721 for driving the first display 731, and/or at least one second DDI 722 for controlling at least one second display 732. The electronic device 101 may include a plurality of DDIs 230, which may be configured to correspond one-to-one with each of the multiple displays 731 and 732.

Hereinafter, for convenience of description, the technical features will be described on the assumption that the electronic device 101 includes a single first display 731 and a single second display 732. The electronic device 101 according to an embodiment of the present disclosure includes at least one second display 732, which is physically separate from and operates independently of the first display 731. It will be apparent to those skilled in the art that at least one second pipeline 1102, processed in parallel with the first pipeline 1101, is configured in relation to the at least one second display 732.

Figure 8:
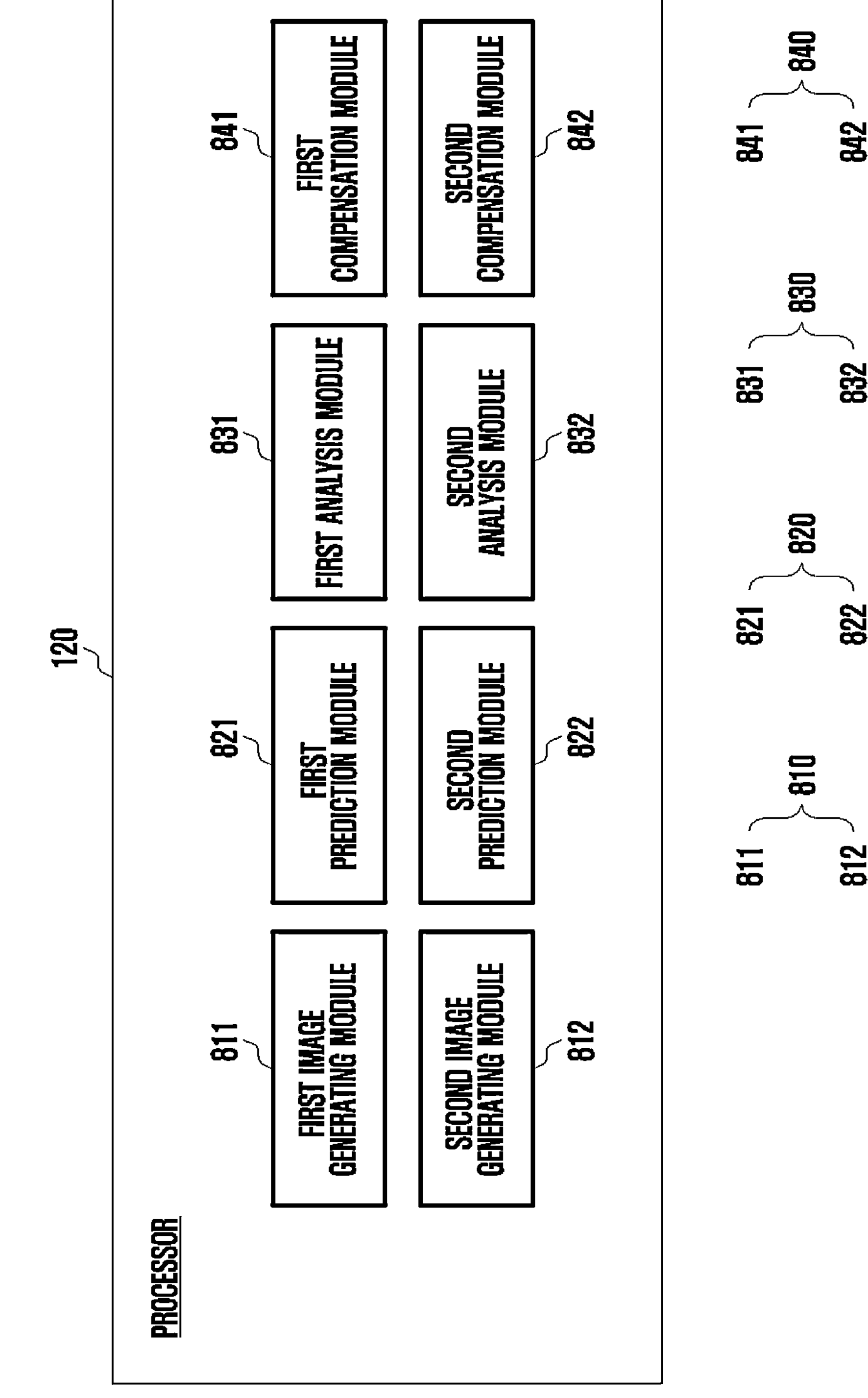
FIG. 8 is a block diagram illustrating an example configuration of a processor, according to various embodiments.

FIG. 8 is a block diagram illustrating an example configuration of the processor 120, according to various embodiments. The processor 120 illustrated in FIG. 8 may be substantially the same as the processor 120 illustrated in FIG. 7.

With reference to FIG. 8, the processor 120 according to an embodiment may include an image generating module 810, a prediction module 820, an analysis module 830, and/or a compensation module 840. The image generating module 810 may include a first image generating module 811, and a second image generating module 812. Each of these modules may include various circuitry and/or executable program instructions. The prediction module 820 may include a first prediction module 821, and a second prediction module 822. The analysis module 830 may include a first analysis module 831, and a second analysis module 832. The compensation module 840 may include a first compensation module 841 and a second compensation module 842. Each of these modules may include various circuitry and/or executable program instructions.

The processor 120 may activate the first pipeline 1101 (e.g., refer to FIG. 11) to display an image through the first display 731 and compensate for burn-in of the first display 731 using the first image generating module 811, the first prediction module 821, the first analysis module 831, and the first compensation module 841. When the processor 120 includes a first processor (not illustrated) for the first display 731 and a second processor (not illustrated) for the second display 732, the first processor (not illustrated) may include the first image generating module 811, the first prediction module 821, the first analysis module 831, and the first compensation module 841.

The processor 120 may activate the second pipeline 1102 (e.g., refer to FIG. 11) to display an image through the second display 732 and compensate for burn-in of the second display 732 using the second image generating module 812, the second prediction module 822, the second analysis module 832, and the second compensation module 842. When the processor 120 includes a first processor (not illustrated) for the first display 731 and a second processor (not illustrated) for the second display 732, the second processor (not illustrated) may include the second image generating module 812, the second prediction module 822, the second analysis module 832, and the second compensation module 842.

The image generating module 810 may be configured to generate (e.g., render) an image to be displayed through the display. The image generating module 810 may generate an image to be displayed through the display on the basis of the executed application. The first image generating module 811 may generate a first image to be displayed through the first display 731 on the basis of the execution of a first application. The second image generating module 812 may generate a second image to be displayed through the second display 732 on the basis of the execution of a second application.

The prediction module 820 may accumulate images generated by the image generating module 810 to generate a prediction map. The prediction map may include a prediction table in which information representing the degree of burn-in (e.g., burn-in score) of the display 731 or 732 is mapped for each area of the display 731 or 732. The prediction module 820 may generate the prediction map on the basis of at least one of the usage time of the display 731 or 732, the brightness of the display 731 or 732, or the characteristics of the display panel of the display 731 or 732 (e.g., organic material characteristics or lifespan characteristics of OLED). The prediction map may store the quantified degree of burn-in for each area of the display 731 or 732, and the quantified values may be referred to as burn-in scores, for example. For example, even within a specific display, deviations in burn-in may exist depending on the usage time of each area and the type of execution screen. The electronic device 101 may generate a prediction map (or burn-in data) that quantifies the degree of burn-in for each area, taking into account the deviation, to compensate for burn-in. The first prediction module 821 may accumulate images generated by the first image generating module 811 to generate a first prediction map (e.g., first burn-in data). The first prediction module 821 may store the generated first prediction map in the first memory 711. The second prediction module 822 may accumulate images generated by the second image generating module 812 to generate a second prediction map (e.g., second burn-in data). The second prediction module 822 may store the generated second prediction map in the second memory 712. The processor 120 may perform the operation of the first prediction module 821 generating and storing the first prediction map and the operation of the second prediction module 822 generating and storing the second prediction map in parallel and independently.

The analysis module 830 may generate a compensation map to compensate for burn-in of the display 731 or 732 on the basis of the prediction map generated by the prediction module 820. The analysis module 830 may compare a predetermined reference value to the burn-in score included in the prediction map to compensate for burn-in of the display 731 or 732, and on the basis of the comparison result, generate a compensation map for performing data compensation of the image to be displayed through the display 731 or 732. The compensation map may include a compensation table in which compensation data for compensating for the image data to be displayed for each area of the display 731 or 732 is mapped for each area of the display 731 or 732. The compensation map may store compensation data for compensating for burn-in for each area of the display 731 or 732. The compensation data may be set to be proportional to the degree of burn-in for each area. For example, when the degree of burn-in in a specific area is high (e.g., burn-in score is high), the compensation data mapped to the corresponding area may be set relatively high. For example, when the degree of burn-in in a specific area is low (e.g., burn-in score is low), the compensation data mapped to the corresponding area may be set relatively low. The first analysis module 831 may generate a first compensation map to compensate for the burn-in of the first display 731 and store the generated first compensation map in the first memory 711. The first analysis module 831 may transmit the generated first compensation map to the first DDI 721. The first DDI 721 may store the first compensation map received from the processor 120 in a first graphical random access memory (GRAM) (e.g., first GRAM 911 in FIG. 9). The second analysis module 832 may generate a second compensation map for compensating for the burn-in of the second display 732, and store the generated second compensation map in the second memory 712. The second analysis module 832 may transmit the generated second compensation map to the second DDI 722. The second DDI 722 may store the second compensation map received from the processor 120 in a second GRAM (e.g., second GRAM 912 in FIG. 9). The processor 120 may perform the operation of the first analysis module 831 generating, storing, and transmitting the first compensation map and the operation of the second analysis module 832 generating, storing, and transmitting the second compensation map in parallel and independently.

The compensation module 840 may convert an image to be displayed by the display into a compensation image on the basis of the compensation map generated by the analysis module 830. The compensation module 840 may control the DDI 230 so that the DDI 230 drives the display using the converted image. For example, the compensation module 840 may control the DDI 230 to allow the display to display the compensation image. The first compensation module 841 may convert an image to be displayed by the first display 731 into a first compensation image on the basis of the compensation map generated by the first analysis module 831. The first compensation module 841 may control the first DDI 721 to allow the first display 731 to display the first compensation image. The second compensation module 842 may convert an image to be displayed by the second display 732 into a second compensation image on the basis of the compensation map generated by the second analysis module 832. The second compensation module 842 may control the second DDI 722 to allow the second display 732 to display the second compensation image. The processor 120 may perform the operation of the first compensation module 841 generating and displaying the first compensation image and the operation of the second compensation module 842 generating and displaying the second compensation image in parallel and independently.

According to an embodiment, with reference to FIGS. 9 and 10, as described below, the electronic device 101 may be configured such that at least a portion of the image generating module 810, prediction module 820, analysis module 830, and/or compensation module 840 included in the processor 120 is included in the DDI 230.

Figure 9:
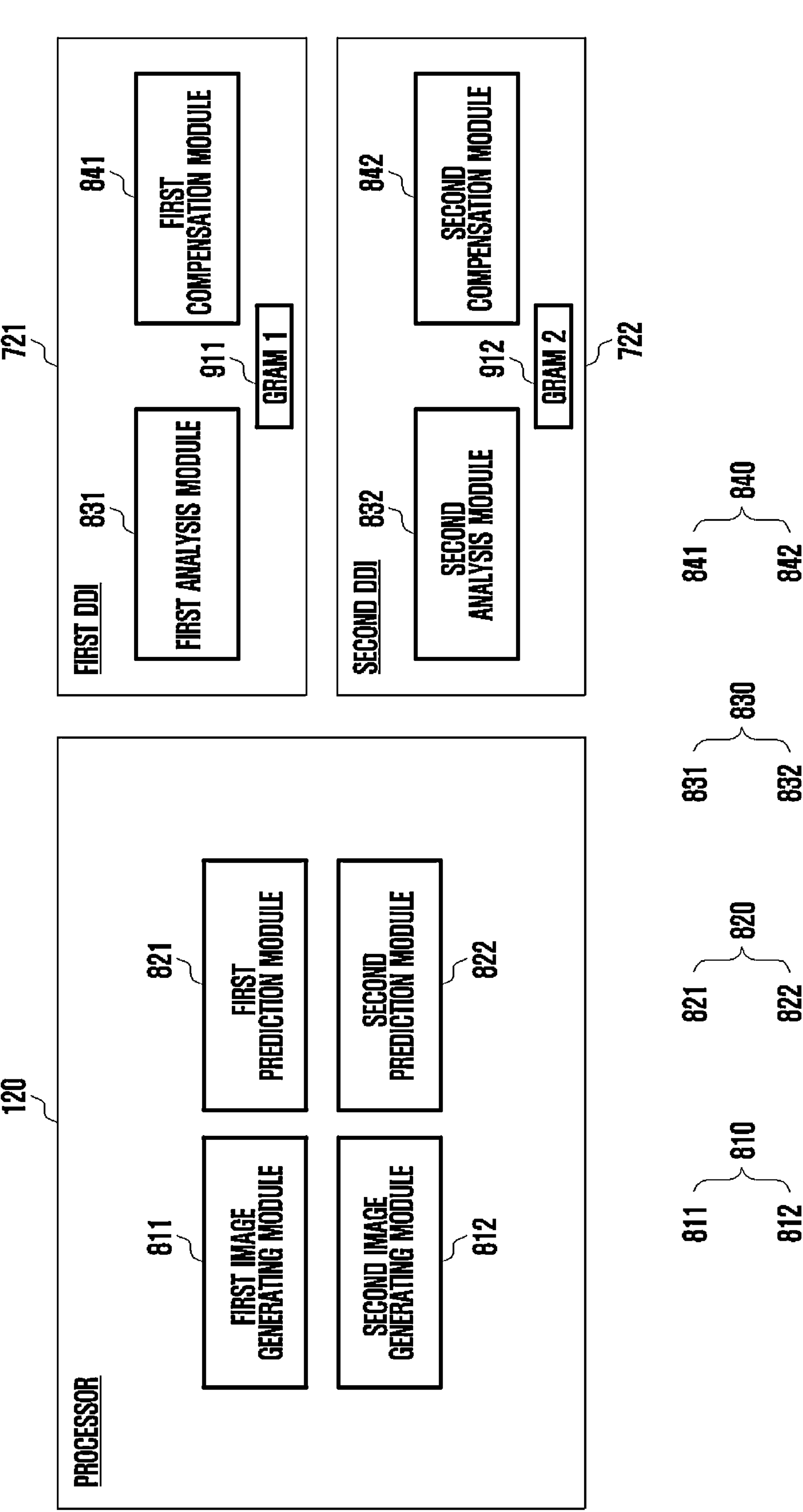
FIG. 9 is a block diagram illustrating an example configuration of a processor and a DDI, according to various embodiments.

FIG. 9 is a block diagram illustrating an example configuration of the processor 120 and the DDI 230, according to various embodiments.

With reference to FIG. 9, in the electronic device 101 according to an embodiment, the processor 120 may include the image generating module 810 and the prediction module 820, and the analysis module 830 and/or the compensation module 840 may be disposed in the DDI 230. For example, the first DDI 721 may include the first analysis module 831, the first compensation module 841, and the first GRAM 911. Accordingly, the first DDI 721 according to an embodiment may generate a first compensation map and generate a first compensation image using the generated first compensation map. For example, the second DDI 722 may include the second analysis module 832, the second compensation module 842, and the second GRAM 912. Accordingly, the second DDI 722 according to an embodiment may generate a second compensation map and generate a second compensation image using the generated second compensation map.

According to an embodiment, the first DDI 721 may not include the first GRAM 911.

According to an embodiment, the second DDI 722 may not include the second GRAM 912.

Figure 10:
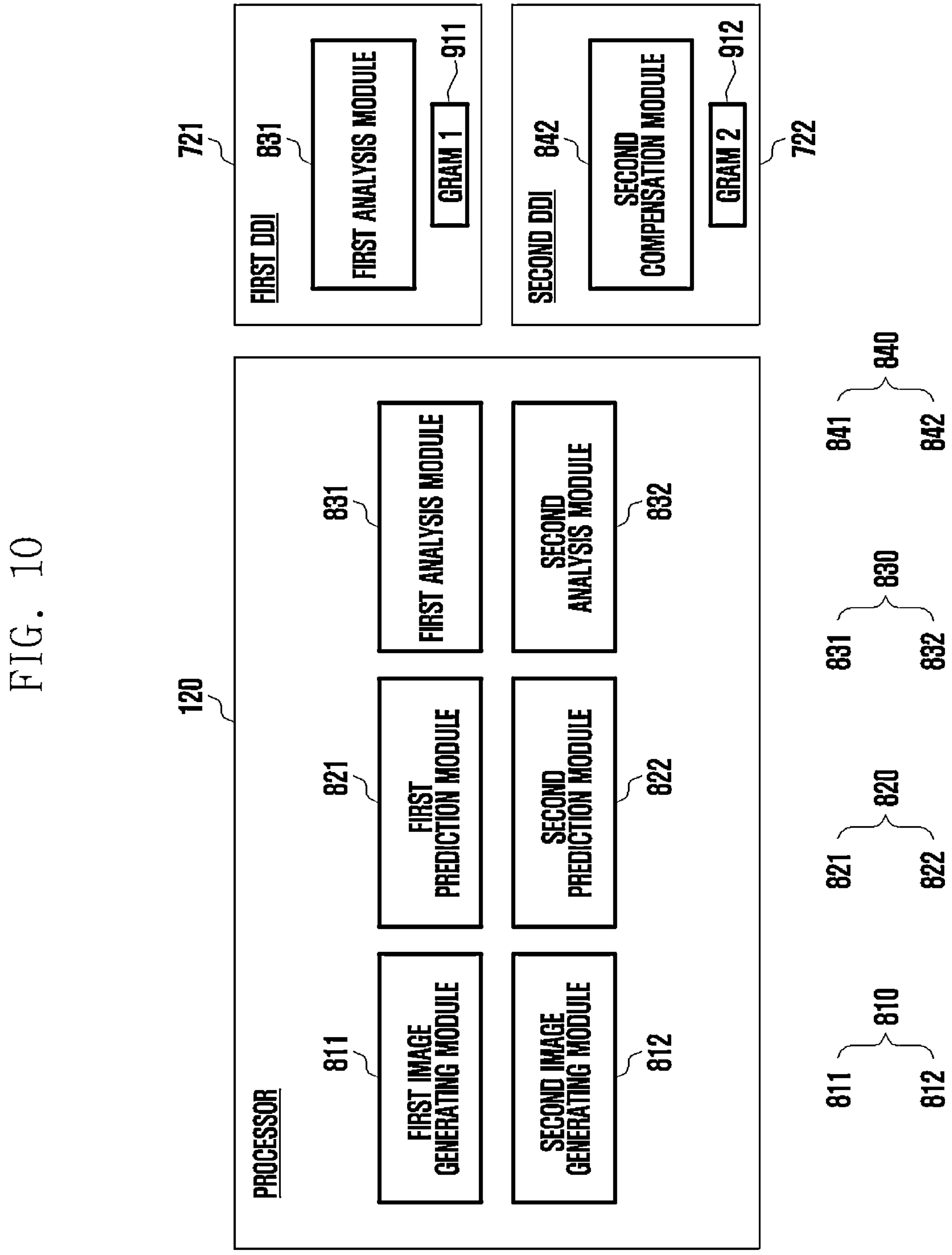
FIG. 10 is a block diagram illustrating an example configuration of a processor and a DDI, according to various embodiments.

FIG. 10 is a block diagram illustrating an example configuration of the processor 120 and the DDI 230, according to various embodiments.

With reference to FIG. 10, in the electronic device 101 according to an embodiment, the processor 120 may include the image generating module 810, the prediction module 820, and the analysis module 830, and the compensation module 840 may be disposed in the DDI 230. For example, the first DDI 721 may include the first compensation module 841, and the first GRAM 911. Accordingly, the first DDI 721 according to an embodiment may generate the first compensation image using the first compensation map generated by the processor 120. For example, the second DDI 722 may include the second compensation module 842, and the second GRAM 912.

Accordingly, the second DDI 722 according to an embodiment may generate the second compensation image using the second compensation map generated by the processor 120.

According to an embodiment, the first DDI 721 may not include the first GRAM 911.

According to an embodiment, the second DDI 722 may not include the second GRAM 912.

Figure 11:
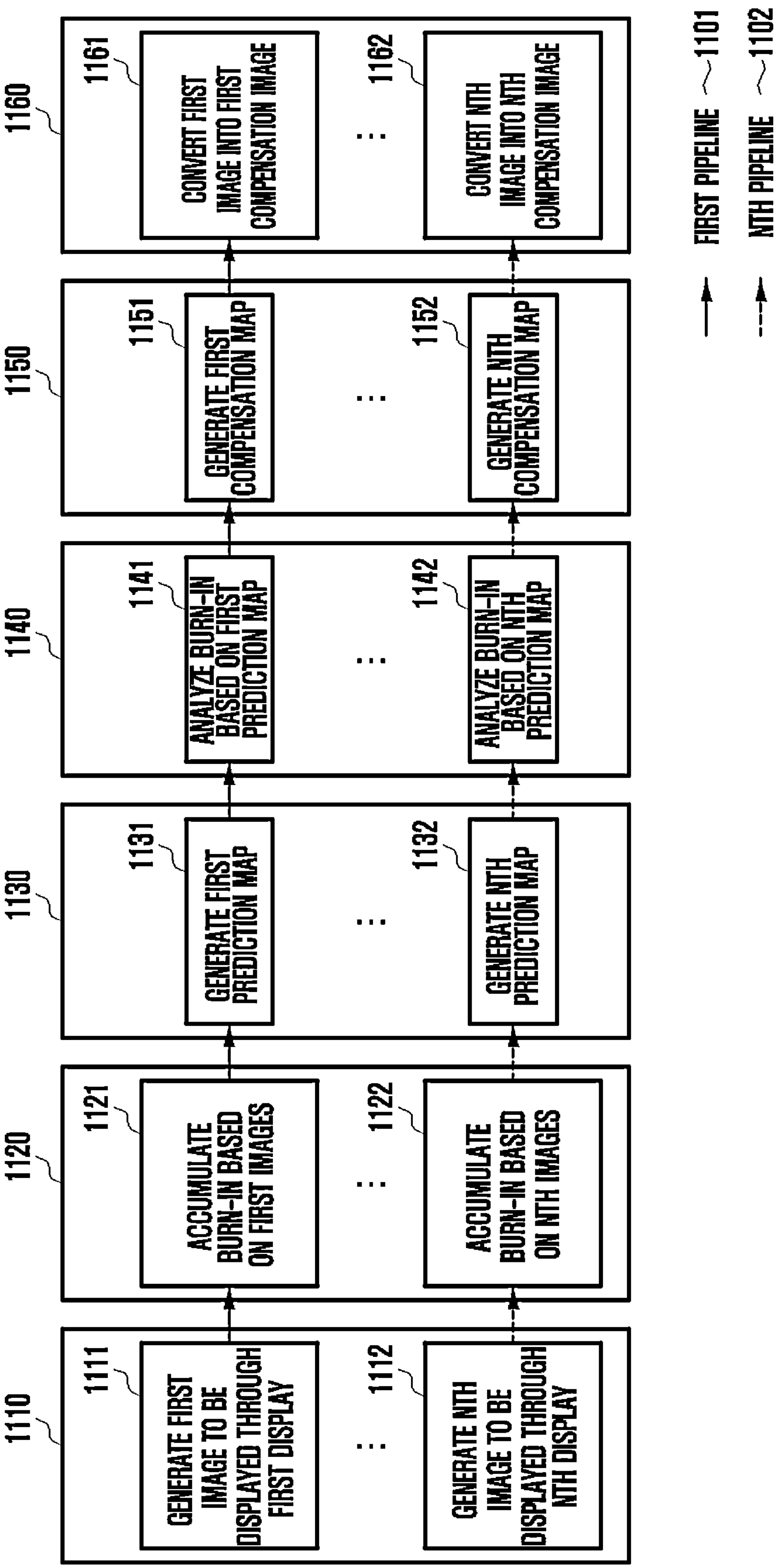
FIG. 11 is a diagram illustrating an example method by which an electronic device compensates for burn-in of multiple displays, according to various embodiments.

FIG. 11 is a diagram illustrating an example method by which the electronic device 101 compensates for burn-in of multiple displays 731 and 732, according to various embodiments. At least some of the operations illustrated in FIG. 11 may be omitted. Before or after at least some of the operations illustrated in FIG. 11, at least some of the operations mentioned with reference to other drawings in the present disclosure may be additionally inserted. The operations illustrated in FIG. 11 may be performed by the processor 120 (e.g., processor 120 in FIG. 1). For example, the memory 130 (e.g., memory 130 in FIG. 1) of the electronic device 101 may store instructions that, when executed, allow the processor 120 to perform at least some of the operations illustrated in FIG. 11. Hereinafter, with reference to FIG. 11, a method by which the electronic device 101 compensates for burn-in of multiple displays 731 and 732 according to an embodiment will be described.

In FIG. 11, the operations connected by the solid arrow 1101 represent a first process (or pipeline) that includes generation of an image, burn-in prediction, and burn-in compensation operations related to the first display 731, which may be operations corresponding to the first pipeline 1101.

In FIG. 11, the operations connected by the solid arrow 1102 represent a second process (or pipeline) that includes generation of an image, burn-in prediction, and burn-in compensation operations related to at least one second display 732 (e.g., nth display) that is physically separate from the first display 731, which may be operations corresponding to the second pipeline 1102. The operations corresponding to the second pipeline 1102 may be performed independently of, and in parallel with, the operations corresponding to the first pipeline 1101.

At operation 1110, the electronic device 101 according to an embodiment may generate (e.g., render) an image to be displayed through the display. The processor 120 may generate an image to be displayed on each of the n displays, as the electronic device 101 includes n physically separate displays. At operation 1111, the first image generating module 811 according to an embodiment may generate a first image to be displayed through the first display 731 on the basis of the execution of a first application. At operation 1112, the second image generating module 812 according to an embodiment may generate a second image (e.g., nth image) to be displayed through at least one second display 732 (e.g., nth display), which is different from the first display 731, on the basis of the execution of a second application.

At operation 1120, the electronic device 101 according to an embodiment may accumulatively calculate the burn-in for each of the n displays. At operation 1121, the first prediction module 821 according to an embodiment may accumulate and store at least one of the usage time of the first display 731, the brightness of the first display 731, and the characteristics of the display panel of the first display 731 (e.g., organic material characteristics and lifespan characteristics of OLED). For example, the first prediction module 821 may accumulate the first image generated by the first image generating module 811 and store the first image in the first memory 711, when the first display 731 transitions to an activation state. According to an embodiment, the first prediction module 821 may stop accumulating the first image and storing the first image in the first memory 711 when the first display 731 transitions to a deactivation state. The first prediction module 821 may re-execute the operations of accumulating the first image and storing the first image in the first memory 711 when the first display 731 transitions from a deactivation state back to an activation state. At operation 1122, the second prediction module 822 according to an embodiment may accumulate and store at least one of the usage time of the second display 732, the brightness of the second display 732, and the characteristics of the display panel of the second display 732 (e.g., organic material characteristics and lifespan characteristics of OLED). For example, the second prediction module 822 may accumulate the second image generated by the second image generating module 812 and store the second image in the second memory 712, when the second display 732 transitions to an activation state. According to an embodiment, the second prediction module 822 may stop accumulating the second image and storing the second image in the second memory 712 when the second display 732 transitions to a deactivation state. The second prediction module 822 may re-execute the operations of accumulating the second image and storing the second image in the second memory 712 when the second display 732 transitions from a deactivation state back to an activation state.

According to an embodiment, the electronic device 101, in accumulatively calculating the burn-in, may perform downscaling of the image to reduce the computational load and may accumulatively calculate the downscaled image. For example, the first prediction module 821 may reduce the resolution of the image generated by the first image generating module 811 to a first resolution preset for processing in the first pipeline 1101, and accumulate and store the image with the reduced first resolution. In this case, the first prediction module 821 may determine whether the newly input first image meets the condition of the first resolution for accumulative calculation, and perform the accumulative calculation only when the newly input first image meets the first resolution condition. For example, the second prediction module 822 may reduce the resolution of the image generated by the second image generating module 812 to a second resolution preset for processing in the second pipeline 1102, and accumulate and store the image with the reduced second resolution. In this case, the second prediction module 822 may determine whether the newly input second image meets the condition of the second resolution for accumulative calculation, and perform the accumulative calculation only when the newly input second image meets the second resolution condition.

According to an embodiment, the processor 120 of the electronic device 101 may divide the display area of the first display 731 into a plurality of block areas (not illustrated) when performing accumulative calculations for burn-in. The electronic device 100 may perform accumulative calculations for burn-in in units of divided block areas. For example, the electronic device 100 may perform accumulative calculations for burn-in for each divided block area and perform burn-in compensation for each divided block area.

According to an embodiment, the processor 120 of the electronic device 101 may divide the display area of the second display 732 into a plurality of block areas (not illustrated) when performing accumulative calculations for burn-in. The electronic device 100 may perform accumulative calculations for burn-in in units of divided block areas. For example, the electronic device 100 may perform accumulative calculations for burn-in for each divided block area and perform burn-in compensation for each divided block area.

According to an embodiment, the processor 120 of the electronic device 101 may store calculation data accumulating the burn-in of each display at designated time intervals in a protected area (e.g., encrypting file system zone (EFS zone)). For example, the processor 120 of the electronic device 101 may store calculation data accumulating the burn-in of each display in a storage buffer that temporarily stores data. The processor 120 may store the accumulated calculation data stored in the storage buffer in a protected area of the processor 120 (e.g., encrypting file system zone (EFS zone)) or in the non-volatile memory 130 at designated time intervals.

At operation 1130, the electronic device 101 according to an embodiment may generate a prediction map corresponding to each of the n displays. At operation 1131, the first prediction module 821 according to an embodiment may accumulate images generated by the first image generating module 811 to generate a first prediction map. The first prediction module 821 may store the generated first prediction map in the first memory 711. At operation 1132, the second prediction module 822 according to an embodiment may accumulate images generated by the second image generating module 812 to generate a second prediction map. The second prediction module 822 may store the generated second prediction map in the second memory 712.

At operation 1140, the electronic device 101 according to an embodiment may analyze the burn-in of each display on the basis of the prediction map corresponding to each of the n displays. At operation 1141, the first analysis module 831 according to an embodiment may compare a predetermined first reference value to the burn-in score included in the first prediction map to compensate for burn-in of the first display 731. The first reference value may include a value set in consideration of the characteristics of the display panel of the first display 731 (e.g., organic material characteristics or lifespan characteristics of OLED). The first analysis module 831 may compare the burn-in score for each area of the first display 731 to the first reference value, and determine, when there is an area where the burn-in score exceeds the first reference value, compensation data for the corresponding area. The compensation data may be set to be proportional to the degree of burn-in for each area. At operation 1142, the second analysis module 832 according to an embodiment may compare a predetermined second reference value to the burn-in score included in the second prediction map to compensate for burn-in of the second display 732. The second reference value may include a value set in consideration of the characteristics of the display panel of the second display 732 (e.g., organic material characteristics or lifespan characteristics of OLED), and may be a value different from the first reference value. The second analysis module 832 may compare the burn-in score for each area of the second display 732 to the second reference value, and determine, when there is an area where the burn-in score exceeds the second reference value, compensation data for the corresponding area. The compensation data may be set to be proportional to the degree of burn-in for each area.

At operation 1150, the electronic device 101 according to an embodiment may generate a compensation map by mapping each area of the displays 731 and 732 with the set compensation data. At operation 1151, the first analysis module 831 according to an embodiment may generate a first compensation map to compensate for burn-in of the first display 731 and store the generated first compensation map in the first memory 711. The first analysis module 831 may transmit the generated first compensation map to the first DDI 721. The first DDI 721 may store the first compensation map received from the processor 120 in a first graphical random access memory (GRAM) (e.g., first GRAM 911 in FIG. 9). At operation 1152, the second analysis module 832 according to an embodiment may generate a second compensation map to compensate for burn-in of the second display 732 and store the generated second compensation map in the second memory 712. The second analysis module 832 may transmit the generated second compensation map to the second DDI 722. The second DDI 722 may store the second compensation map received from the processor 120 in a second GRAM (e.g., second GRAM 912 in FIG. 9).

At operation 1160, the electronic device 101 according to an embodiment may convert the image generated by the image generating module 810 into a compensation image on the basis of the compensation map and control the display to display the converted compensation image. At operation 1161, the first compensation module 841 according to an embodiment may convert the image to be displayed by the first display 731 into a first compensation image on the basis of the compensation map generated by the first analysis module 831. The first compensation module 841 may control the first DDI 721 to allow the first display 731 to display the first compensation image. At operation 1162, the second compensation module 842 according to an embodiment may convert the image to be displayed by the second display 732 into a second compensation image on the basis of the compensation map generated by the second analysis module 832. The second compensation module 842 may control the second DDI 722 to allow the second display 732 to display the second compensation image.

FIG. 12 is a flowchart illustrating an example method by which the electronic device 101 compensates for burn-in on the basis of user patterns (e.g., user habits) of using each of the multiple displays 731 and 732, according to various embodiments.

Figure 13A:
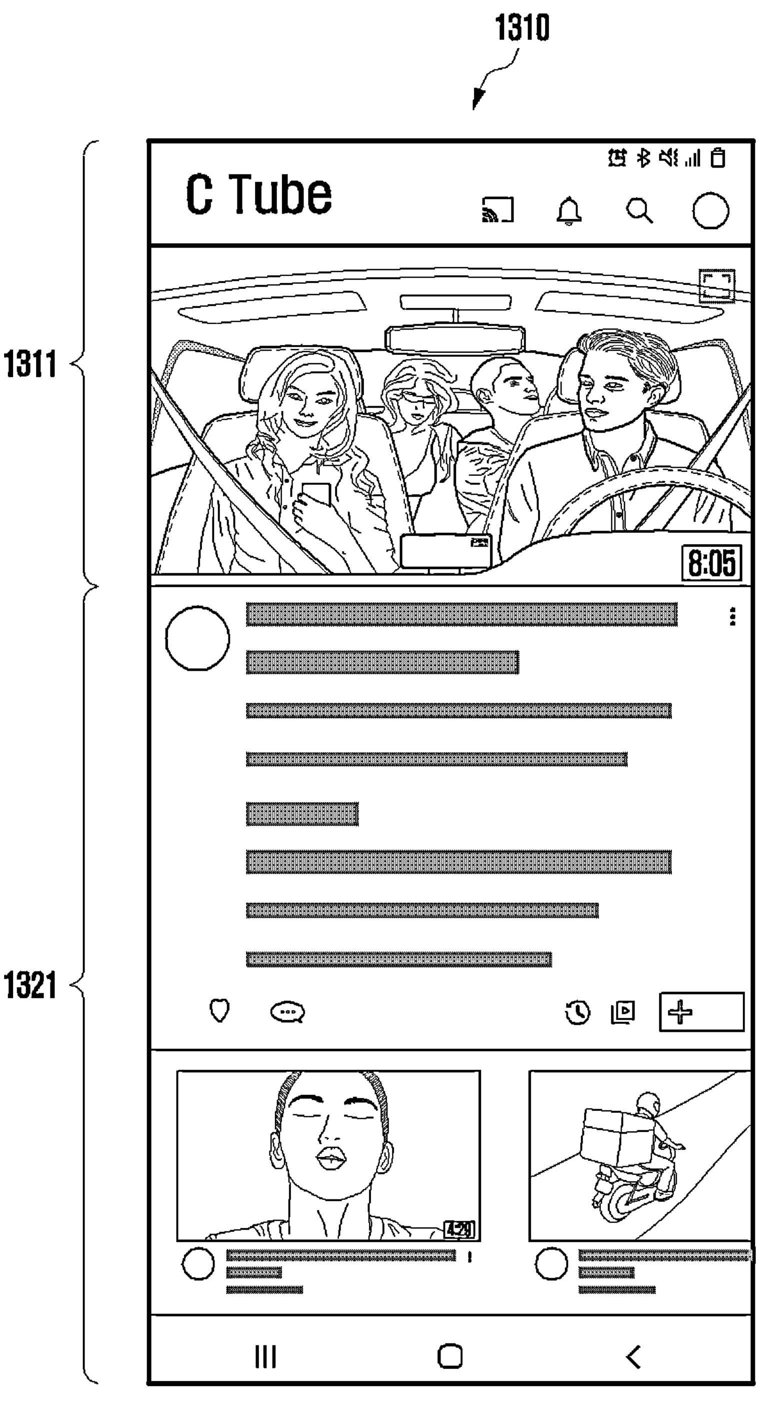
FIG. 13A is a diagram illustrating an example state in which an electronic device displays an execution screen of a first application through a first display, according to various embodiments.

FIG. 13A is a diagram illustrating an example of a state in which the electronic device 101 displays an execution screen of a first application through the first display 731, according to various embodiments.

Figure 13B:
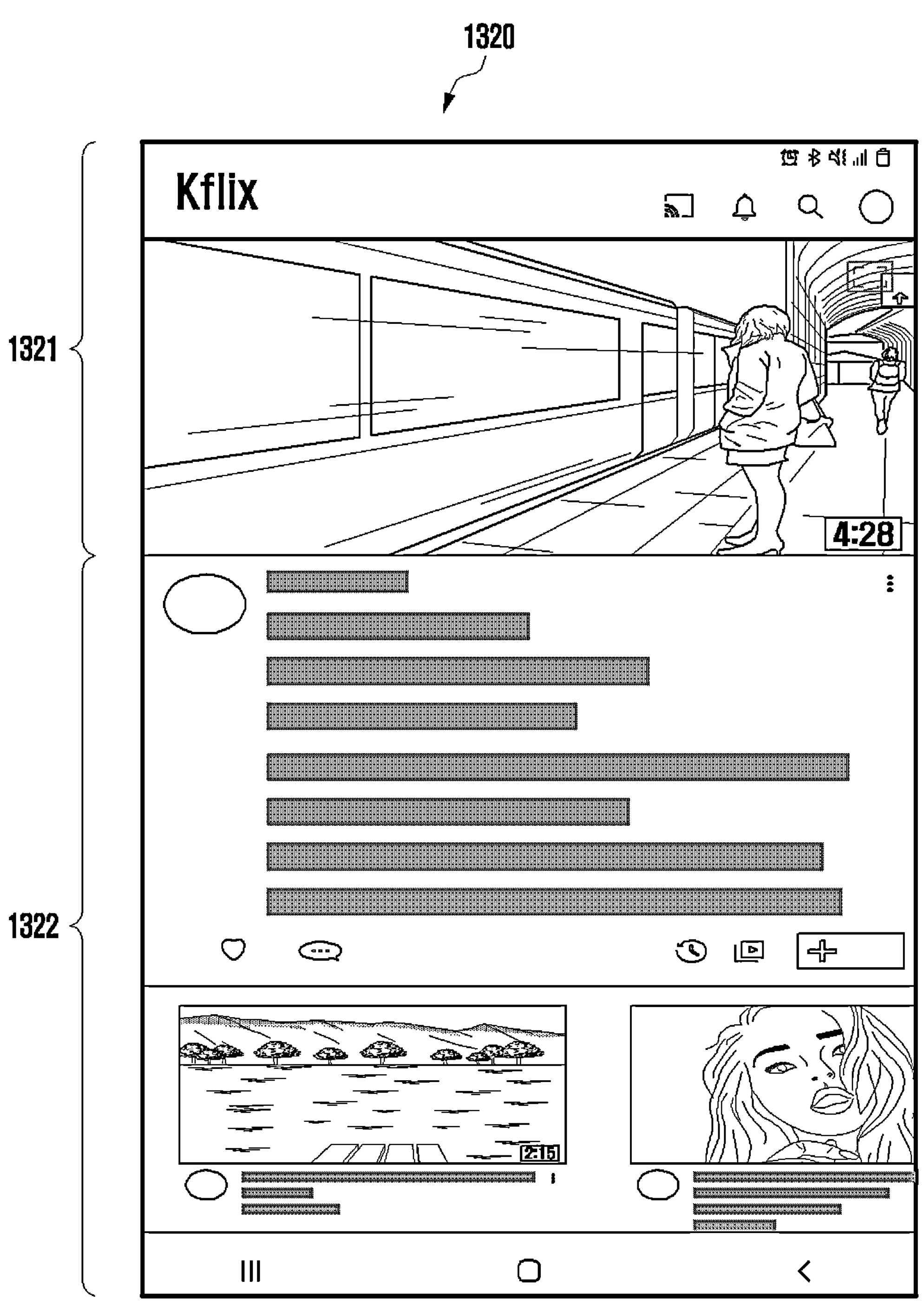
FIG. 13B is a diagram illustrating an example state in which an electronic device displays an execution screen of a second application through a second display, according to various embodiments.

FIG. 13B is a diagram illustrating an example of a state in which the electronic device 101 displays an execution screen of a second application through the second display 732, according to various embodiments.

The operations illustrated in FIG. 12 may be performed by the processor 120 (e.g., processor 120 in FIG. 1). For example, the memory 130 (e.g., memory 130 in FIG. 1) of the electronic device 101 may store instructions that, when executed, allow the processor 120 to perform at least some of the operations illustrated in FIG. 12. Hereinafter, with reference to FIG. 12, FIG. 13A, and FIG. 13B, a method by which the electronic device 101 compensates for burn-in on the basis of user patterns of using each of the multiple displays 731 and 732 according to an embodiment will be described.

At operation 1210, the electronic device 101 according to an embodiment may generate an nth prediction map and accumulate and store the burn-in of the first display 731 and the second display 732, respectively. Operation 1210 may be substantially the same as operations 1120 to 1130 described with reference to FIG. 11.

At operation 1220, the electronic device 101 according to an embodiment may compare the accumulated first burn-in data of the first display 731 to the accumulated second burn-in data of the second display 732. For example, the electronic device 101 may compare the first prediction map generated on the basis of the first burn-in data to the second prediction map generated on the basis of the second burn-in data.

At operation 1230, the electronic device 101 according to an embodiment may calculate a similarity of the first burn-in data and the second burn-in data. The electronic device 101 may determine whether the similarity of the first burn-in data and the second burn-in data is less than a designated threshold. A high similarity of the first burn-in data and the second burn-in data may indicate that a usage pattern (e.g., usage habit) for a user of using the first display 731 and a usage pattern of using the second display 732 are similar during a specific time period in which the first burn-in data and the second burn-in data are obtained.

For example, with reference to FIGS. 13A and 13B, a user of the electronic device 101 may have a usage pattern of frequently using a video application, and the electronic device 101 may have accumulated and stored burn-in resulting from mainly displaying the execution screen of the video application using each of the first display 731 and the second display 732. FIG. 13A illustrates an execution screen 1310 of a first application, which is a video application. FIG. 13B illustrates an execution screen 1320 of a second application, which is a video application. Generally, in a video application, an upper area of the execution screen (e.g., 1311 in FIG. 13A, 1321 in FIG. 13B) is an area where a video is played, and a lower area of the execution screen (e.g., 1312 in FIG. 13A, 1322 in FIG. 13B) may be an information display area where text or thumbnails are displayed. Therefore, when the electronic device 101 displays the execution screen of an application with similar or identical attributes (or type) using each of the first display 731 and the second display 732, causing burn-in to be accumulated on each of the first display 731 and the second display 732, the pattern of burn-in progression on the first display 731 and the pattern of burn-in progression on the second display 732 may be similar. In this case, the similarity of the first burn-in data and the second burn-in data obtained by the electronic device 101 may be greater than or equal to the threshold, and the electronic device 101 may set this as a trigger for operation 1250.

For example, the user of the electronic device 101 may primarily run an application with a certain attribute (or type) through the first display 731, while primarily running an application with a different attribute through the second display 732. For example, the user may primarily use a video application using the first display 731, while primarily using a messenger application (or messaging application) using the second display 732. In this case, the similarity of the first burn-in data and the second burn-in data obtained by the electronic device 101 may be less than the threshold. When the similarity of the first burn-in data and the second burn-in data obtained by the electronic device 101 is less than the threshold, the burn-in progression pattern of the first display 731 and that of the second display 732 may be different. Therefore, the burn-in prediction and compensation for the first display 731 and the burn-in prediction and compensation for the second display 732 may be performed independently of each other.

According to an embodiment, the electronic device 101 may perform operation 1240 when the similarity of the first burn-in data and the second burn-in data is less than a designated threshold (e.g., result of operation 1230 is "Yes").

According to an embodiment, the electronic device 101 may perform operation 1250 when the similarity of the first burn-in data and the second burn-in data is greater than or equal to a designated threshold (e.g., result of operation 1230 is "No").

At operation 1240, the electronic device 101 according to an embodiment may independently and in parallel process the burn-in compensation operation for the first display 731 and the burn-in compensation operation for the second display 732 when the similarity of the first burn-in data and the second burn-in data is less than a designated threshold (e.g., result of operation 1230 is "Yes"). For example, the electronic device 101 may compensate for the burn-in of the first display 731 on the basis of the first burn-in data, and compensate for the burn-in of the second display 732 on the basis of the second burn-in data. Operation 1240 may be substantially the same as operations 1140 to 1160 described with reference to FIG. 11.

At operation 1250, the electronic device 101 according to an embodiment may stop accumulating burn-in for the first display 731 and perform accumulation only for the burn-in of the second display 732 when the similarity of the first burn-in data and the second burn-in data is greater than or equal to a designated threshold (e.g., result of operation 1230 is "No"). The electronic device 101 according to an embodiment may also stop accumulating burn-in for the second display 732 and perform accumulation only for the burn-in of the first display 731. The electronic device 101 according to an embodiment may perform burn-in accumulation for either the first display 731 or the second display 732, and may accumulate burn-in for the pipeline with a relatively lower computational load. For example, the resolution of the first display 731 may be set higher than the resolution of the second display 732. In this case, the electronic device 101 may stop accumulating burn-in for the first display 731, which has a relatively higher computational load, and perform burn-in accumulation only for the second display 732.

The electronic device 101 according to an embodiment may change the cycle for performing burn-in accumulation for the first display 731 while maintaining the cycle for performing burn-in accumulation for the second display 732 when the similarity of the first burn-in data and the second burn-in data is greater than or equal to a designated threshold (e.g., result of operation 1230 is "No"). For example, when the similarity of the first burn-in data and the second burn-in data is greater than or equal to a designated threshold, the electronic device 101 may change the cycle for performing burn-in accumulation for the first display 731 from a first time cycle to a second time cycle that is longer than the first time cycle.

The electronic device 101 according to an embodiment may adjust the cycle for performing burn-in accumulation for the first display 731 to be longer than the cycle for performing burn-in accumulation for the second display 732 when the similarity of the first burn-in data and the second burn-in data is greater than or equal to a designated threshold (e.g., result of operation 1230 is "No"). For example, when the similarity of the first burn-in data and the second burn-in data is greater than or equal to a designated threshold, the electronic device 101 may set the cycle for performing burn-in accumulation for the first display 731 to a third time cycle, and set the cycle for performing burn-in accumulation for the second display 732 to a fourth time cycle that is shorter than the third time cycle.

At operation 1260, the electronic device 101 according to an embodiment may compensate for the burn-in of each of the first display 731 and the second display 732 on the basis of the accumulated second burn-in data. For example, the electronic device 101 may generate a single compensation map on the basis of the second burn-in data, and may be configured to compensate for the burn-in of both the first display 731 and the second display 732 using the generated compensation map.

At operation 1270, the electronic device 101 according to an embodiment may be configured to compensate for the burn-in of both the first display 731 and the second display 732 using a single compensation map only during a reference time period. The electronic device 101 may re-execute operation 1230 when the reference time has elapsed (e.g., result of operation 1270 is "Yes"). The electronic device 101 may re-execute operation 1250 when the reference time has not elapsed (e.g., result of operation 1270 is "No").

Figure 14:
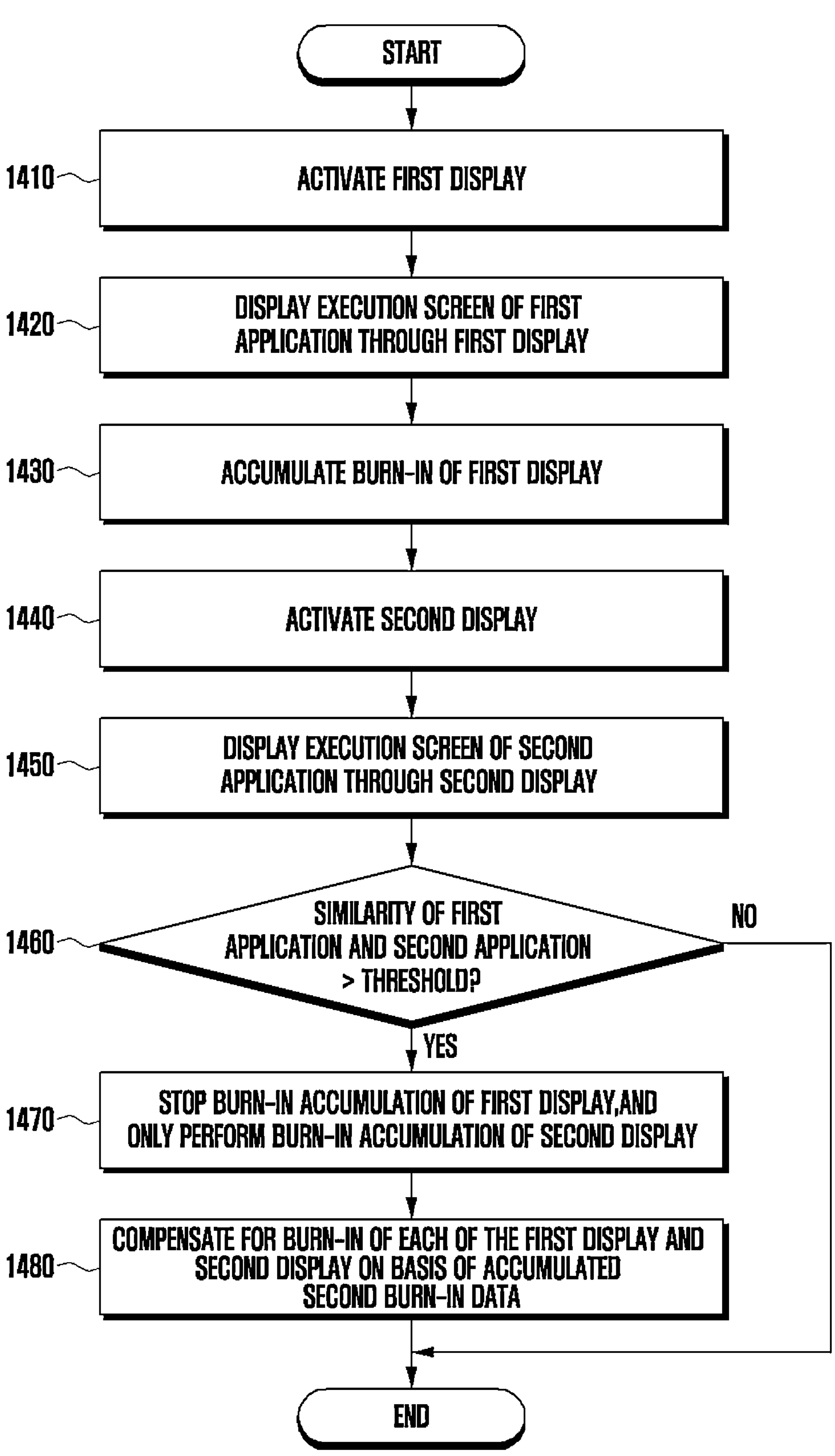
FIG. 14 is a flowchart illustrating an example method by which an electronic device compensates for burn-in based on similarity of applications executed through each of multiple displays, according to various embodiments.

FIG. 14 is a flowchart illustrating an example method by which the electronic device 101 compensates for burn-in on the basis of similarity of applications executed through each of multiple displays 731 and 732, according to various embodiments.

Figure 15A:
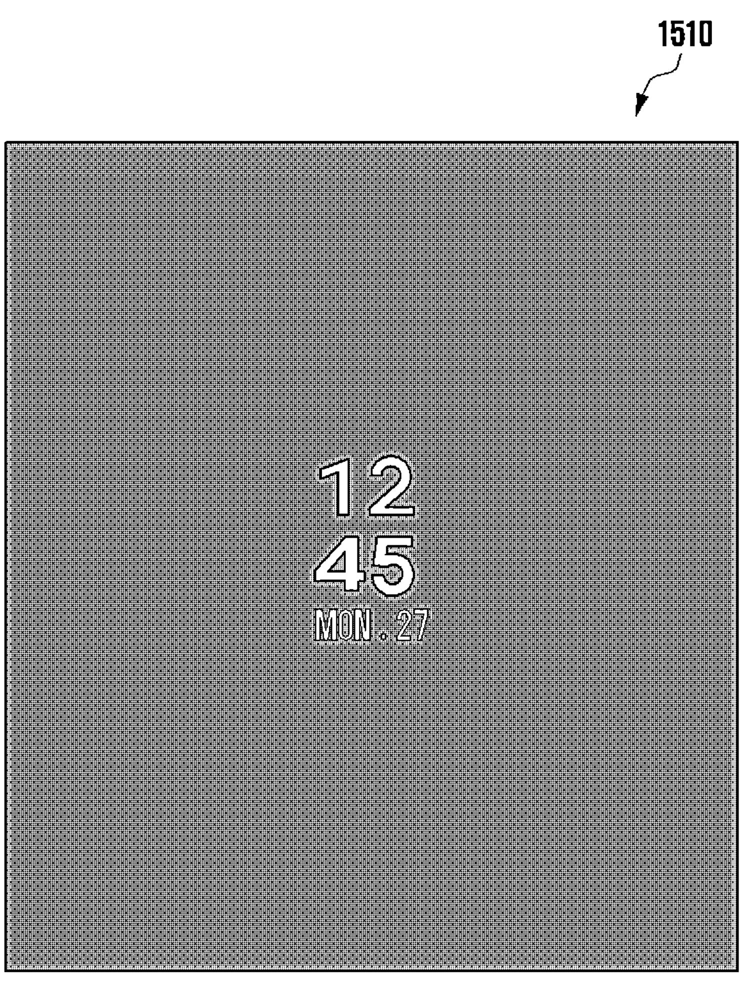
FIG. 15A is a diagram illustrating an example state in which an electronic device displays an execution screen of a first application through a first display, according to various embodiments.

FIG. 15A is a diagram illustrating an example of a state in which the electronic device 101 displays an execution screen of a first application through the first display 731, according to various embodiments.

Figure 15B:
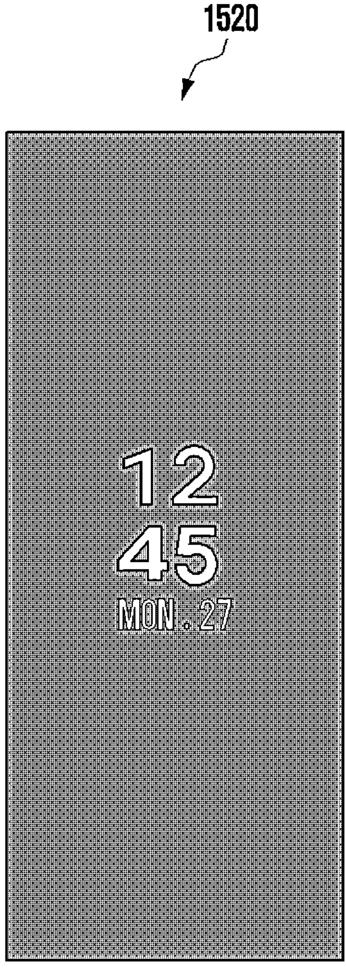
FIG. 15B is a diagram illustrating an example state in which an electronic device displays an execution screen of a first application through a second display, according to various embodiments.

FIG. 15B is a diagram illustrating an example of a state in which the electronic device 101 displays an execution screen of a first application through the second display 732, according to various embodiments.

The operations illustrated in FIG. 14 may be performed by the processor 120 (e.g., processor 120 in FIG. 1). For example, the memory 130 (e.g., memory 130 in FIG. 1) of the electronic device 101 may store instructions that, when executed, allow the processor 120 to perform at least some of the operations illustrated in FIG. 14. Hereinafter, with reference to FIG. 14, FIG. 15A, and FIG. 15B, a method by which the electronic device 101 compensates for burn-in on the basis of the similarity of applications executed through each of the multiple displays 731 and 732 according to an embodiment will be described.

At operation 1410, the electronic device 101 according to an embodiment may activate the first display 731. The electronic device 101 may activate the first display 731 on the basis of a designated trigger (e.g., user input).

At operation 1420, the electronic device 101 according to an embodiment may display the execution screen of a first application through the first display 731. The electronic device 101 may execute the first application on the basis of user input and control the first display 731 to display the execution screen of the first application.

At operation 1430, the electronic device 101 according to an embodiment may generate a first image to be displayed through the first display 731 on the basis of the activation of the first display 731 and perform cumulative calculations for burn-in of the first display 731 on the basis of the accumulation of the first images.

At operation 1440, the electronic device 101 according to an embodiment may activate the second display 732. The electronic device 101 may activate the second display 732 on the basis of a designated trigger (e.g., user input).

At operation 1450, the electronic device 101 according to an embodiment may display the execution screen of a second application through the second display 732. The electronic device 101 may execute the second application on the basis of user input and control the second display 732 to display the execution screen of the second application.

At operation 1460, the electronic device 101 according to an embodiment may calculate the similarity of the first application and the second application. The electronic device 101 may determine whether the similarity of the first application and the second application is greater than a designated threshold. For example, the electronic device 101 may identify the attribute (or type) of the first application by referencing attribute information (e.g., tag information) on the first application. The electronic device 101 may identify the attribute (or type) of the second application by referencing attribute information (e.g., tag information) on the second application. The electronic device 101 may determine that the similarity of the first application and the second application is greater than a designated threshold when the attribute information on the first application is the same as the attribute information on the second application. The electronic device 101 may determine that the similarity of the first application and the second application is less than or equal to a designated threshold when the attribute information on the first application is different from the attribute information on the second application.

In the disclosure, the attribute information on the first application being the same as the attribute information on the second application may indicate that the type of the first application and the type of the second application are identical or similar. For example, when each of the first application and the second application is an application related to messenger, the attribute information on the first application and the attribute information on the second application may be the same. For example, when each of the first application and the second application is an application related to video playback, the attribute information on the first application and the attribute information on the second application may be the same. For example, when each of the first application and the second application is an application related to music playback, the attribute information on the first application and the attribute information on the second application may be the same. For example, when each of the first application and the second application is an application related to Internet browser, the attribute information on the first application and the attribute information on the second application may be the same.

According to an embodiment, when the attribute information on the first application is the same as the attribute information on the second application, the electronic device 101 may consider the burn-in progression pattern caused by displaying the execution screen of the first application and the burn-in progression pattern caused by displaying the execution screen of the second application to be similar, and perform subsequent operations.

According to an embodiment, the electronic device 101 may perform operation 1470 when it is determined that the similarity of the first application and the second application is greater than a designated threshold (e.g., result of operation 1460 is "Yes").

According to an embodiment, the electronic device 101 may terminate the operation process illustrated in FIG. 14 when it is determined that the similarity of the first application and the second application is less than or equal to a designated threshold (e.g., result of operation 1460 is "No").

FIG. 15A illustrates a state 1510 in which the first display 731 displays an always-on display (AOD) screen, and FIG. 15B illustrates a state 1520 in which the second display 732 displays the same or a similar AOD screen as the first display 731. As illustrated in FIGS. 15A and 15B, when the electronic device 101 displays the execution screen of the same single application or the execution screen of similar applications through each of the first display 731 and the second display 732, the burn-in progression pattern of the first display 731 and the burn-in progression pattern of the second display 732 may be similar. In this case, the electronic device 101 may determine that the similarity of the first application and the second application is greater than a designated threshold.

At operation 1470, the electronic device 101 according to an embodiment may stop accumulating burn-in for the first display 731 and perform accumulation only for the burn-in of the second display 732 when it is determined that the similarity of the first application and the second application is greater than a designated threshold (e.g., result of operation 1460 is "Yes"). Operation 1470 may be substantially the same as operation 1250 described with reference to FIG. 12.

At operation 1480, the electronic device 101 according to an embodiment may compensate for the burn-in of each of the first display 731 and the second display 732 on the basis of the accumulated second burn-in data. For example, the electronic device 101 may generate a single compensation map on the basis of the second burn-in data, and may be configured to compensate for the burn-in of both the first display 731 and the second display 732 using the generated compensation map. Operation 1480 may be substantially the same as operation 1260 described with reference to FIG. 12.

Figure 16:
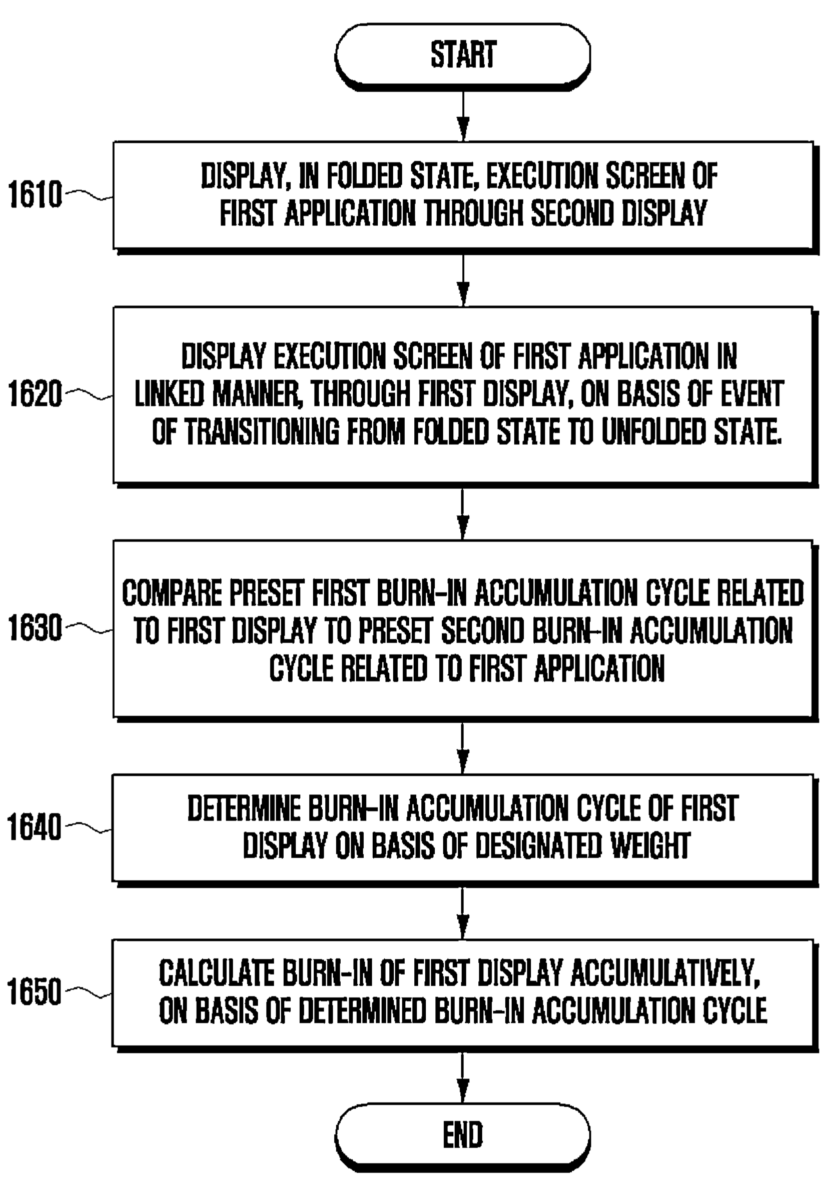
FIG. 16 is a flowchart illustrating an example method by which an electronic device adjusts a burn-in accumulation cycle based on a designated weight according to various embodiments.

FIG. 16 is a flowchart illustrating an example method by which the electronic device 101, adjusts a burn-in accumulation cycle based on a designated weight according to various embodiments.

The operations illustrated in FIG. 16 may be performed by the processor 120 (e.g., processor 120 in FIG. 1). For example, the memory 130 (e.g., memory 130 in FIG. 1) of the electronic device 101 may store instructions that, when executed, allow the processor 120 to perform at least some of the operations illustrated in FIG. 16. Hereinafter, with reference to FIG. 16, a method by which the electronic device 101 adjusts the burn-in accumulation cycle on the basis of a designated weight according to an embodiment will be described.

The electronic device 101 described in FIG. 16 may be the electronic device 300 (e.g., foldable electronic device) as described with reference to FIGS. 3 to 6.

At operation 1610, the electronic device 101 according to an embodiment may display the execution screen of the first application through the second display 732 in the folded state. For example, in the folded state, the electronic device 101 may display the execution screen of the first application using the second display 732, which is a sub-display.

At operation 1620, the electronic device 101 according to an embodiment may detect an event of transitioning from the folded state to the unfolded state. The electronic device 101 may display the execution screen of the first application through the first display 731 on the basis of the detected event. The electronic device 101 may display the execution screen of the first application through the first display 731 in conjunction with the execution screen of the first application that was being displayed through the second display 732 at operation 1610. Accordingly, the user may easily transition from an environment of using the first application through the second display 732 to an environment of using the first application through the first display 731, thereby improving user convenience.

At operation 1630, the electronic device 101 according to an embodiment may compare a first burn-in accumulation cycle preset in relation to the first display 731 to a second burn-in accumulation cycle preset in relation to the first application. For example, each of the multiple displays of the electronic device 101 may have a burn-in accumulation cycle preset for obtaining burn-in data, depending on the type of display panel, the usage time of the displays 731 and 732 or the like. For example, the first display 731, which is a main display, may be set to obtain burn-in data and perform accumulative calculations for burn-in every 60 seconds, while the second display 732, which is a sub-display, may be set to obtain burn-in data and perform accumulative calculations for burn-in every 30 seconds. The burn-in accumulation cycle preset in relation to the first display 731 may be the same as the burn-in accumulation cycle preset in relation to the second display 732, but this may be set differently depending on the type of display panel, the usage time of the displays 731 and 732 or the like.

According to an embodiment, the electronic device 101 may be configured to adjust the burn-in accumulation cycle not only according to the type of display 731 or 732, but also according to the type of application (or attribute of the application). For example, in case of a messenger application (or messaging application), the user tends to run the messenger application relatively frequently, but each time the application is run, the duration of continuous use tends to be relatively short. Therefore, in case of a messenger application, the burn-in accumulation cycle may be set to a relatively short time, such as approximately 10 seconds. For example, in case of a video application, the user tends to run the video application relatively less frequently compared to a messenger application, but the duration of continuous use tends to be relatively longer each time the video application is run. Therefore, in case of a video application, the burn-in accumulation cycle may be set to a relatively long duration, such as approximately one minute.

According to an embodiment, when the electronic device 101 displays the execution screen of the first application through the first display 731, in case that the first burn-in accumulation cycle (e.g., 60 seconds) preset in relation to the first display 731 and the second burn-in accumulation cycle (e.g., 10 seconds) preset in relation to the first application (e.g., messenger application) displayed through the first display 731 are different, the electronic device 101 may compare the two cycles.

At operation 1640 and operation 1650, the electronic device 101 according to an embodiment may determine the burn-in accumulation cycle for accumulating burn-in of the first display 731 on the basis of a designated weight, and perform accumulative calculations for burn-in of the first display 731 on the basis of the determined burn-in accumulation cycle.

According to an embodiment, the electronic device 101 may set a higher weight to time and select the burn-in accumulation cycle corresponding to a shorter cycle from the first burn-in accumulation cycle (e.g., 60 seconds) preset in relation to the first display 731 and the second burn-in accumulation cycle (e.g., 10 seconds) preset in relation to the first application (e.g., messenger application) displayed through the first display 731. For example, when the first burn-in accumulation cycle is 60 seconds and the second burn-in accumulation cycle is 10 seconds, the electronic device 101 may perform accumulative calculations for burn-in of the first display 731 on the basis of the second burn-in accumulation cycle of 10 seconds.

According to an embodiment, the electronic device 101 may set a higher weight to the application displayed through the first display 731 and select the second burn-in accumulation cycle corresponding to the first application from the first burn-in accumulation cycle (e.g., 60 seconds) preset in relation to the first display 731 and the second burn-in accumulation cycle (e.g., 10 seconds) preset in relation to the first application (e.g., messenger application) displayed through the first display 731. For example, when the first burn-in accumulation cycle is 30 seconds and the second burn-in accumulation cycle is 60 seconds, the electronic device 101 may perform accumulative calculations for burn-in of the first display 731 on the basis of the second burn-in accumulation cycle of 60 seconds.

According to an embodiment, although not illustrated, when the electronic device 101 displays the execution screen of the first application through the second display 732, in case that a third burn-in accumulation cycle (e.g., 60 seconds) preset in relation to the second display 732 and the second burn-in accumulation cycle (e.g., 10 seconds) preset in relation to the first application (e.g., messenger application) displayed through the first display 731 are different, the electronic device 101 may compare the two cycles. In this case, the electronic device 101 may determine the burn-in accumulation cycle for accumulating burn-in of the second display 732 on the basis of a weight that is designated, similarly to the operations described in operations 1640 and 1650.

An electronic device (e.g., electronic device 101 in FIG. 1), according to an example embodiment, may include: a first display (e.g., first display 731 in FIG. 8), at least one second display (e.g., second display 732 in FIG. 8) different from the first display, a first display driver integrated circuit (DDI) configured to drive the first display (e.g., first DDI 721 in FIG. 8), at least one second DDI (e.g., second DDI 722 in FIG. 8) configured to drive the at least one second display 732, and at least one processor (e.g., processor 120 in FIG. 1), comprising processing circuitry, wherein at least one processor, individually and/or collectively, may be configured to generate a first image to be displayed through the first display and a second image to be displayed through the at least one second display; accumulate the first image to generate a first prediction map indicative of a degree of burn-in of the first display; accumulate the second image to generate a second prediction map indicative of a degree of burn-in of the at least one second display; generate a first compensation map for compensating for burn-in of the first display based on the first prediction map, and store the generated first compensation map in a first memory; generate a second compensation map for compensating for burn-in of the at least one second display based on the second prediction map, and store the generated second compensation map in a second memory; convert the first image into a first compensation image based on the first compensation map, and control the first DDI to allow the first display to display the first compensation image; and convert the second image into a second compensation image based on the second compensation map, and control the second DDI to allow the at least one second display to display the second compensation image.

According to an example embodiment, at least one processor, individually and/or collectively, may be configured to: calculate a similarity of first burn-in data corresponding to the first prediction map and second burn-in data corresponding to the second prediction map, deactivate an operation of the first prediction module, based on the similarity being greater than or equal to a designated threshold, stop accumulating the first image or to change an accumulation cycle of the first image, activate an operation of the second prediction module to perform accumulation of the second image, generate the first compensation map and the second compensation map based on the accumulated second image, generate the first compensation image based on the generated first compensation map, and generate the second compensation image based on the generated second compensation map.

According to an example embodiment, at least one processor, individually and/or collectively, may be configured to: determine, based on the accumulated second image, whether a reference time has elapsed from an occasion of generating the first compensation map and the second compensation map, based on the reference time elapsing, perform accumulation of the first image, and recalculate a similarity of first burn-in data corresponding to the first prediction map and second burn-in data corresponding to the second prediction map.

According to an example embodiment, at least one processor, individually and/or collectively, may be configured to: generate the first compensation map based on the first prediction map and generate the second compensation map based on the second prediction map based on the similarity being less than a designated threshold.

According to an example embodiment, at least one processor, individually and/or collectively, may be configured to control the electronic device to: display an execution screen of a first application through the first display, display an execution screen of a second application through the second display, calculate a similarity of the first application and the second application, based on the similarity being greater than a designated threshold, stop accumulating the first image, perform accumulation of the second image, generate the first compensation map and the second compensation map based on the accumulated second image, generate the first compensation image based on the generated first compensation map, and generate the second compensation image based on the generated second compensation map.

According to an example embodiment, the first compensation map may be generated based on the first prediction map, and the second compensation map may be generated based on the second prediction map based on the similarity being less than or equal to a designated threshold.

According to an example embodiment, at least one processor, individually and/or collectively, may be configured to determine, by comparing tag information on the first application and tag information on the second application, whether the similarity is greater than a designated threshold.

According to an example embodiment, the electronic device may further include a foldable housing including a first housing and a second housing disposed to face each other in a folded state, in which the first display may be disposed on a first surface of the first housing and a third surface of the second housing, and the second display may be disposed on a second surface of the first housing opposite the first surface, wherein at least one processor, individually and/or collectively, may be configured to control the electronic device to: display an execution screen of a first application through the second display in the folded state, based on an event of transitioning from the folded state to an unfolded state, allow the execution screen of the first application being displayed through the second display to be displayed through the first display in a linked manner, select, based on a designated weight, one of a first burn-in accumulation cycle specified in relation to the first display and a second burn-in accumulation cycle specified in relation to the first application, and accumulate, based on the selected burn-in accumulation cycle, first burn-in data of the first display.

According to an example embodiment, at least one processor, individually and/or collectively, may be configured to select a burn-in accumulation cycle corresponding to a shorter cycle from the first burn-in accumulation cycle and the second burn-in accumulation cycle.

According to an example embodiment, at least one processor, individually and/or collectively, may be configured to select the second burn-in accumulation cycle from the first burn-in accumulation cycle and the second burn-in accumulation cycle.

In a method of an electronic device, according to an example embodiment, the electronic device may include a first display, at least one second display different from the first display, a first display driver integrated circuit (DDI) configured to drive the first display, and at least one second DDI configured to drive the at least one second display. The method may include: generating a first image to be displayed through the first display and a second image to be displayed through the at least one second display, accumulating the first image to generate a first prediction map indicative of a degree of burn-in of the first display, accumulating the second image to generate a second prediction map indicative of a degree of burn-in of the at least one second display, generating a first compensation map for compensating for burn-in of the first display based on the first prediction map, and storing the generated first compensation map in a first memory, generating a second compensation map for compensating for burn-in of the at least one second display based on the second prediction map, and storing the generated second compensation map in a second memory, converting the first image into a first compensation image based on the first compensation map, and controlling the first DDI to allow the first display to display the first compensation image, and converting the second image into a second compensation image based on the second compensation map, and controlling the second DDI to allow the at least one second display to display the second compensation image.

According to an example embodiment, the method may include: calculating a similarity of first burn-in data corresponding to the first prediction map and second burn-in data corresponding to the second prediction map, based on the similarity being greater than or equal to a designated threshold, stop accumulating the first image or to change an accumulation cycle of the first image, and perform accumulation of the second image, generating the first compensation map and the second compensation map based on the accumulated second image, generating the first compensation image based on the generated first compensation map, and generating the second compensation image based on the generated second compensation map.

According to an example embodiment, the method may include: determining, based on the accumulated second image, whether a reference time has elapsed from an occasion of generating the first compensation map and the second compensation map, based on the reference time elapsing, perform accumulation of the first image, and recalculating a similarity of first burn-in data corresponding to the first prediction map and second burn-in data corresponding to the second prediction map.

According to an example embodiment, the method may include: generating the first compensation map based on the first prediction map, and generating the second compensation map based on the second prediction map based on the similarity being less than a designated threshold.

According to an example embodiment, the method may include: displaying an execution screen of a first application through the first display, displaying an execution screen of a second application through the second display, calculating a similarity of the first application and the second application, based on the similarity being greater than a designated threshold, stop accumulating the first image and perform accumulation of the second image, generating the first compensation map and the second compensation map based on the accumulated second image, generating the first compensation image based on the generated first compensation map, and generating the second compensation image based on the generated second compensation map.

According to an example embodiment, the method may include generating the first compensation map based on the first prediction map, and generating the second compensation map based on the second prediction map based on the similarity being less than or equal to a designated threshold.

According to an example embodiment, the method may include determining, by comparing tag information on the first application and tag information on the second application, whether the similarity is greater than a designated threshold.

According to an example embodiment, the electronic device may further include: a foldable housing including a first housing and a second housing disposed to face each other in a folded state, in which the first display may be disposed on a first surface of the first housing and a third surface of the second housing, and the second display may be disposed on a second surface of the first housing opposite the first surface, wherein the method may include: displaying an execution screen of a first application through the second display in the folded state, based on an event of transitioning from the folded state to an unfolded state, allowing the execution screen of the first application being displayed through the second display to be displayed through the first display in a linked manner, selecting, based on a designated weight, one of a first burn-in accumulation cycle specified in relation to the first display and a second burn-in accumulation cycle specified in relation to the first application, and accumulating, based on the selected burn-in accumulation cycle, first burn-in data of the first display.

According to an example embodiment, the method may include selecting a burn-in accumulation cycle corresponding to a shorter cycle from the first burn-in accumulation cycle and the second burn-in accumulation cycle.

According to an example embodiment, the method may include selecting the second burn-in accumulation cycle from the first burn-in accumulation cycle and the second burn-in accumulation cycle.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:

a first display;

at least one second display different from the first display;

a first display driver integrated circuit (DDI) configured to drive the first display;

at least one second DDI configured to drive the at least one second display; and at least one processor, comprising processing circuitry, wherein at least one processor, individually and/or collectively, is configured to:

generate a first image to be displayed through the first display and a second image to be displayed through the at least one second display;

accumulate the first image to generate a first prediction map indicative of a degree of burn-in of the first display;

accumulate the second image to generate a second prediction map indicative of a degree of burn-in of the at least one second display;

identify a similarity of first burn-in data corresponding to the first prediction map and second burn-in data corresponding to the second prediction map;

based on the similarity being greater than or equal to a designated threshold, stop accumulating an image among the first image and the second image and maintain accumulating another image among the first image and the second image, generate a first compensation map for compensating for burn-in of the first display based on the first prediction map, and store the generated first compensation map in a first memory;

generate a second compensation map for compensating for burn-in of the at least one second display based on the second prediction map, and store the generated second compensation map in a second memory;

convert the first image into a first compensation image based on the first compensation map, and control the first DDI to allow the first display to display the first compensation image; and convert the second image into a second compensation image based on the second compensation map, and control the second DDI to allow the at least one second display to display the second compensation image.

2. The electronic device of claim 1, wherein at least one processor, individually and/or collectively, is configured to:

based on the similarity being greater than or equal to a designated threshold and resolution of the first display being higher than the resolution of the second display, stop accumulating the first image or change an accumulation cycle of the first image and perform accumulation of the second image;

generate the first compensation map and the second compensation map based on the accumulated second image;

generate the first compensation image based on the generated first compensation map; and generate the second compensation image based on the generated second compensation map.

3. The electronic device of claim 2, wherein at least one processor, individually and/or collectively, is configured to:

determine, based on the accumulated second image, whether a reference time has elapsed from an occasion of generating the first compensation map and the second compensation map;

based on the reference time elapsing, perform accumulation of the first image; and recalculate a similarity of first burn-in data corresponding to the first prediction map and second burn-in data corresponding to the second prediction map.

4. The electronic device of claim 2, wherein at least one processor, individually and/or collectively, is configured to: generate the first compensation map based on the first prediction map and generate the second compensation map based on the second prediction map based on the similarity being less than a designated threshold.

5. The electronic device of claim 1, wherein at least one processor, individually and/or collectively, is configured to:

control the electronic device to display an execution screen of a first application through the first display;

control the electronic device to display an execution screen of a second application through the second display;

calculate a similarity of the first application and the second application;

based on the similarity being greater than a designated threshold, stop accumulating the first image;

perform accumulation of the second image;

generate the first compensation map and the second compensation map based on the accumulated second image;

generate the first compensation image based on the generated first compensation map; and generate the second compensation image based on the generated second compensation map.

6. The electronic device of claim 5, wherein the first compensation map is generated based on the first prediction map, and the second compensation map is generated based on the second prediction map based on the similarity being less than or equal to a designated threshold.

7. The electronic device of claim 5, wherein at least one processor, individually and/or collectively, is configured to determine, by comparing tag information on the first application and tag information on the second application, whether the similarity is greater than a designated threshold.

8. The electronic device of claim 1, further comprising:

a foldable housing including a first housing and a second housing disposed to face each other in a folded state, wherein the first display is disposed on a first surface of the first housing and a third surface of the second housing, and the second display is disposed on a second surface of the first housing opposite the first surface, wherein at least one processor, individually and/or collectively, is configured to:

control the electronic device to display an execution screen of a first application through the second display in the folded state;

control transitioning from the folded state to an unfolded state, to allow the execution screen of the first application being displayed through the second display to be displayed through the first display in a linked manner;

select, based on a designated weight, one of a first burn-in accumulation cycle specified in relation to the first display and a second burn-in accumulation cycle specified in relation to the first application; and accumulate, based on the selected burn-in accumulation cycle, first burn-in data of the first display.

9. The electronic device of claim 8, wherein at least one processor, individually and/or collectively, is configured to select a burn-in accumulation cycle corresponding to a shorter cycle from the first burn-in accumulation cycle and the second burn-in accumulation cycle.

10. The electronic device of claim 8, wherein at least one processor, individually and/or collectively, is configured to select the second burn-in accumulation cycle from the first burn-in accumulation cycle and the second burn-in accumulation cycle.

11. A method of an electronic device, the electronic device comprising:

a first display;

at least one second display different from the first display;

a first display driver integrated circuit (DDI) configured to drive the first display; and at least one second DDI configured to drive the at least one second display, the method comprising:

generating a first image to be displayed through the first display and a second image to be displayed through the at least one second display;

accumulating the first image to generate a first prediction map indicative of a degree of burn-in of the first display;

accumulating the second image to generate a second prediction map indicative of a degree of burn-in of the at least one second display;

identifying a similarity of first burn-in data corresponding to the first prediction map and second burn-in data corresponding to the second prediction map;

based on the similarity being greater than or equal to a designated threshold, stopping accumulating an image among the first image and the second image and maintaining accumulating another image among the first image and the second image;

generating a first compensation map for compensating for burn-in of the first display based on the first prediction map, and storing the generated first compensation map in a first memory;

generating a second compensation map for compensating for burn-in of the at least one second display based on the second prediction map, and storing the generated second compensation map in a second memory;

converting the first image into a first compensation image based on the first compensation map, and controlling the first DDI to allow the first display to display the first compensation image; and converting the second image into a second compensation image based on the second compensation map, and controlling the second DDI to allow the at least one second display to display the second compensation image.

12. The method of claim 11, comprising:

based on the similarity being greater than or equal to a designated threshold and resolution of the first display being higher than the resolution of the second display, stop accumulating the first image or change an accumulation cycle of the first image, and perform accumulation of the second image;

generating the first compensation map and the second compensation map based on the accumulated second image;

generating the first compensation image based on the generated first compensation map; and generating the second compensation image based on the generated second compensation map.

13. The method of claim 12, comprising:

determining, based on the accumulated second image, whether a reference time has elapsed from an occasion of generating the first compensation map and the second compensation map;

based on the reference time elapsing, perform accumulation of the first image; and recalculating a similarity of first burn-in data corresponding to the first prediction map and second burn-in data corresponding to the second prediction map.

14. The method of claim 12, comprising:

generating the first compensation map based on the first prediction map, and generating the second compensation map based on the second prediction map based on the similarity being less than a designated threshold.

15. The method of claim 11, comprising:

displaying an execution screen of a first application through the first display;

displaying an execution screen of a second application through the second display;

calculating a similarity of the first application and the second application;

based on the similarity being greater than a designated threshold, stop accumulating the first image or change accumulation cycle of the first image, and perform accumulation of the second image;

generating the first compensation map and the second compensation map based on the accumulated second image;

generating the first compensation image based on the generated first compensation map; and generating the second compensation image based on the generated second compensation map.

* * * * *